US008410734B2

(12) United States Patent
Ueda et al.

(10) Patent No.: US 8,410,734 B2
(45) Date of Patent: Apr. 2, 2013

(54) MOTOR CONTROL DEVICE AND ELECTRIC POWER STEERING DEVICE

(75) Inventors: Takeshi Ueda, Kashiba (JP); Nobuhiro Uchida, Yamatotakada (JP); Kouya Yoshida, Kashihara (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 12/812,678

(22) PCT Filed: Jan. 16, 2009

(86) PCT No.: PCT/JP2009/050510
§ 371 (c)(1),
(2), (4) Date: May 13, 2011

(87) PCT Pub. No.: WO2009/091015
PCT Pub. Date: Jul. 23, 2009

(65) Prior Publication Data
US 2011/0214934 A1 Sep. 8, 2011

(30) Foreign Application Priority Data

Jan. 16, 2008 (JP) .................................. 2008-006658
Feb. 4, 2008 (JP) .................................. 2008-023646
Feb. 12, 2008 (JP) .................................. 2008-030151

(51) Int. Cl.
*H02P 21/00* (2006.01)
(52) U.S. Cl. ................................. 318/400.02; 318/430
(58) Field of Classification Search .................. 318/430, 318/432, 434, 400.02, 400.15, 400.42
See application file for complete search history.

(56) References Cited

U.S. PATENT DOCUMENTS

| 6,427,104 | B1 * | 7/2002 | Matsushita et al. ............. 701/41 |
| 6,927,548 | B2 * | 8/2005 | Nishizaki et al. ............. 318/432 |
| 2001/0005121 | A1 | 6/2001 | Sakamaki |

(Continued)

FOREIGN PATENT DOCUMENTS

| JP | 2000 184773 | 6/2000 |
| JP | 2001 187578 | 7/2001 |

(Continued)

OTHER PUBLICATIONS

U.S. Appl. No. 12/935,784, filed Sep. 30, 2010, Ueda, et al.

(Continued)

*Primary Examiner* — Walter Benson
*Assistant Examiner* — Iftekhar Mustafa
(74) *Attorney, Agent, or Firm* — Oblon, Spivak, McClelland, Maier & Neustadt, L.L.P.

(57) ABSTRACT

In a motor control device, a control calculation unit obtains a phase voltage instruction value. A current detecting unit detects an electric current which flows into the brushless motor. A rotational position detecting unit detects the rotational position of a rotor in the brushless motor. A correction unit corrects the phase voltage instruction value based on the detection results of the current detecting unit and the rotational position detecting unit so that a dependency of a ratio on an electric angle shown by a secondary harmonic component of the ratio concerning the electric angle of the brushless motor. The ratio is a ratio of a q-axis or d-axis component of the electric current, which flows into the brushless motor, to a q-axis or d-axis instruction value. A driving unit drives the brushless motor based on the phase voltage instruction value after the correction by the correction unit.

6 Claims, 16 Drawing Sheets

U.S. PATENT DOCUMENTS

| | | |
|---|---|---|
| 2008/0191655 A1 | 8/2008 | Ueda et al. |
| 2008/0211446 A1* | 9/2008 | Kobayashi .................... 318/611 |
| 2009/0009127 A1* | 1/2009 | Imamura et al. ............. 318/601 |

FOREIGN PATENT DOCUMENTS

| | | |
|---|---|---|
| JP | 2004 72856 | 3/2004 |
| JP | 2005-130654 | 5/2005 |
| JP | 2005 218215 | 8/2005 |
| JP | 2007-215306 | 8/2007 |
| JP | 2007 228767 | 9/2007 |

OTHER PUBLICATIONS

U.S. Appl. No. 12/935,816, filed Sep. 30, 2010, Ueda, et al.

U.S. Appl. No. 12/811,774, filed Jul. 6, 2010, Ueda, et al.

Office Action issued Aug. 28, 2012, in Japanese Patent Application No. 2008-023646, filed Feb. 4, 2008 (w/Englishlanguage Translation), 5 pages.

International Search Report issued Apr. 21, 2009 in PCT/JP09/50510 filed Jan. 16, 2009.

* cited by examiner

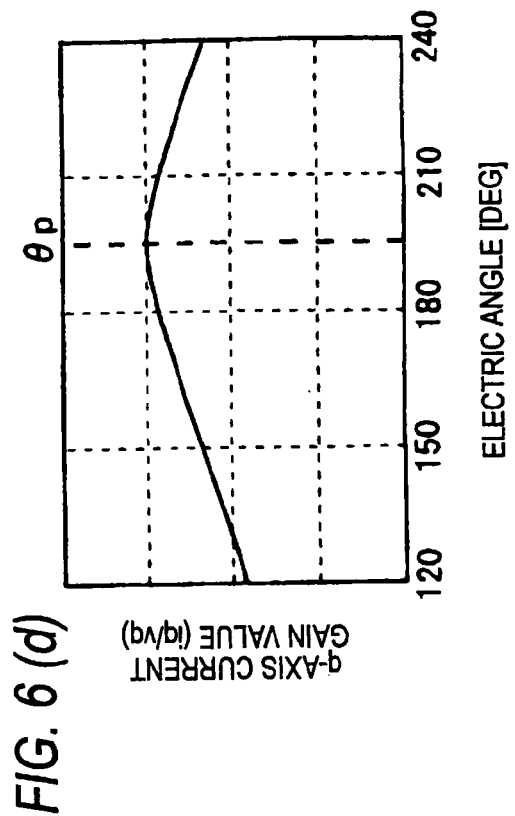
FIG. 6 (a)
FIG. 6 (b)
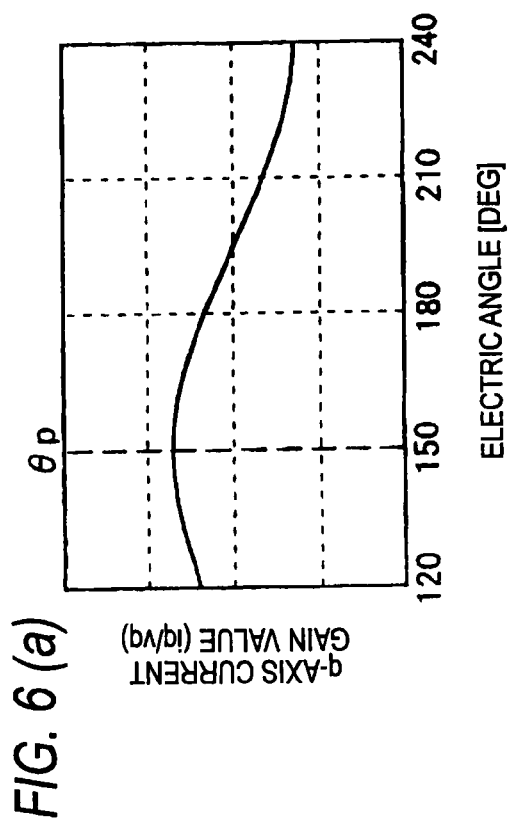
FIG. 6 (c)
FIG. 6 (d)

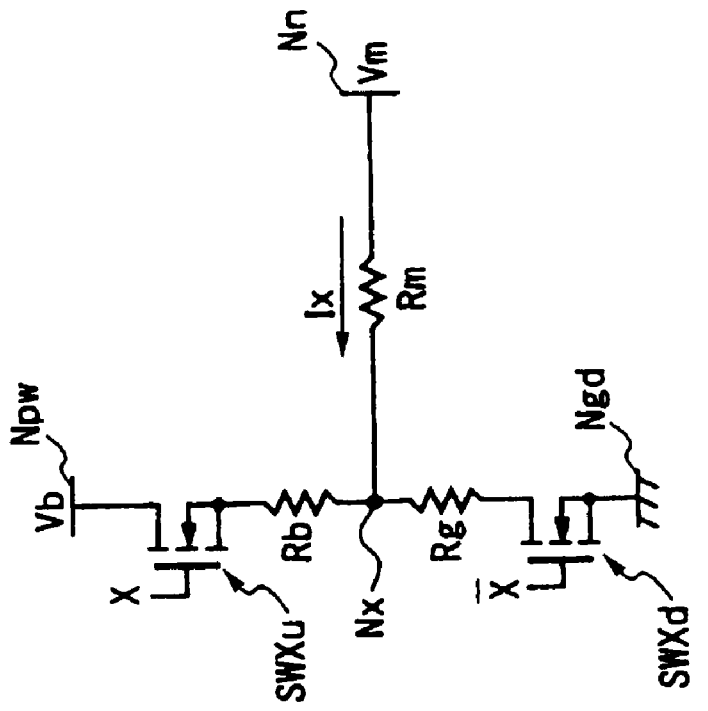
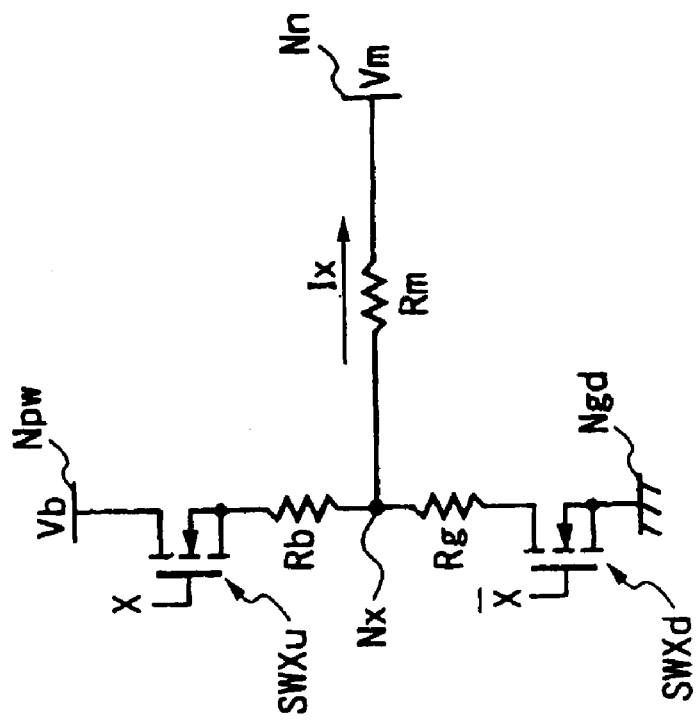

MOTOR CONTROL DEVICE AND ELECTRIC POWER STEERING DEVICE

TECHNICAL FIELD

The present invention relates to a motor control device for driving a brushless motor, and an electric power steering device including such a motor control device.

BACKGROUND ART

An electric power steering device which gives steering assist power to a steering mechanism of a vehicle has conventionally been an electric motor driven according to the steering torque applied to a handle (steering wheel) by a driver. Although a brush motor has conventionally been widely used as an electric motor of an electric power steering device, a brushless motor has recently been also used from viewpoints of improvements in reliability and durability, reduction of inertia, or the like.

In order to control the torque generated in a motor, generally, a motor control device detects an electric current which flows into the motor, and performs PI control (proportional integral control) based on the difference between an electric current to be supplied to the motor, and the detected current. In order to detect currents of two or more phases, two or three current sensors are provided in the motor control device which drives a 3-phase brushless motor.

In addition, in connection with the present application invention, obtaining a d-axis voltage instruction value and a q-axis voltage instruction value using the circuit equation of a motor is disclosed in JP-A-2001-187578. Additionally, correcting a d-axis current instruction value according to the temperature of a motor is disclosed in JP-A-2000-184773.

DISCLOSURE OF THE INVENTION

Technical Problem

In the motor control device included in the electric power steering device, the current sensor needs to detect a large current of 100 A or higher. This current sensor is large-sized and hinders miniaturization of the control device of the electric power steering device. For this reason, reduction of current sensors becomes a challenge in the motor control device included in the electric power steering device or the like. If current sensors can be reduced, the costs and power consumption of the motor control device can also be reduced.

As a method of reducing the current sensors, a method of reducing the current sensors to one and performing the same feedback control as a conventional technique, a method of removing all current sensors, and performing an open loop control according to the circuit equation of the motor, or the like are considered.

In the former method of these methods, there is a problem in that a plurality of phase currents required for the feedback control may be unable to be detected by one current sensor depending on the rotational position of the rotor of the motor, and control of the motor may become discontinuous. On the other hand, such a problem does not occur in the latter method. However, in the latter method, unlike the feedback control concerning an electric current, there is a problem in that a ripple (referred to as a "torque ripple") is generated in the output torque of the motor when a difference is caused in resistance between phases due to the following factors.

i) As relays are arranged in two phases for fail-safe, resistance difference equivalent to the contact resistances of the relays is caused.

ii) The contact resistances of connectors for connecting the motor with the motor control device are different from each other between phases.

Particularly, in the electric power steering device, the smoothness of the output torque of the motor is be treated as important from the viewpoint of an improvement in steering feel. Thus, suppressing generation of such a torque ripple is required.

Additionally, the brushless motor for steering assist is driven by a motor drive circuit built in an electronic control unit (hereinafter referred to as "ECU"). In the electric power steering device, since miniaturization, high efficiency, and low cost are demanded, various proposals are made as to integration or the like of this ECU and the brushless motor.

Meanwhile, when there is a difference between phases as to resistance components in a motor/driving circuit system including a brushless motor and a driving circuit, generation of the ripple (referred to as a "torque ripple") in the output torque of the motor becomes a problem. Particularly, in the electric power steering device, the smoothness of the output torque of the motor is to be treated as important from the viewpoint of an improvement in steering feel. Thus, suppressing generation of such a torque ripple is required.

On the other hand, in the electric power steering device, there is suggested a configuration (for example, refer to JP-A-2005-319971) which includes a resistance adjusting means which adjusts the resistance components in the motor/driving circuit system so that the interphase difference (hereinafter referred to as an "interphase resistance difference") between the resistance components in the motor/driving circuit system including a brushless motor and a driving circuit is equal to or less than a predetermined value.

However, when a resistance is applied in order to eliminate the interphase resistance difference in the motor/driving circuit system, degradation of the efficiency in driving or response of the brushless motor is caused. For this reason, in a circuit board (hereinafter referred to as a "motor driving circuit board") on which the driving circuit of the motor is mounted, it is preferable to form a wiring pattern so that the interphase resistance difference in the motor/driving circuit system is eliminated.

However, when an attempt to form a wiring pattern so that the torque ripple is sufficiently reduced is made, the circuit pattern in the above motor driving circuit board becomes complicated, and the space for forming the circuit pattern increases. That is, in the motor driving circuit board, it is possible to design the wiring pattern so that wiring resistances of paths from a power supply terminal to a grounding terminal are aligned between phases. However, it is difficult to make the wiring resistances sufficiently small to such a degree that does not influence motor driving, or to symmetrically arrange the switching elements which constitute the motor drive circuit. For this reason, when the wiring pattern is formed so that a resistance component (hereinafter referred to as an "upper stage arm resistance") from the power supply terminal to the output end of the motor drive circuit and a resistance component (hereinafter referred to as a "lower stage arm resistance") from the output end to the grounding terminal are aligned, the circuit pattern becomes complicated, a large space for forming the circuit pattern becomes necessary, and the size of the board increases. As a result, in the electric power steering device, the board area within the ECU becomes large, and this runs counter to the above demand for miniaturization or the like.

Therefore, an object of the invention is to provide a motor control device which can drive a brushless motor so that generation of a torque ripple resulting from generation of the interphase resistance difference is suppressed. Additionally, another object of the invention is to provide an electric power steering device including such a motor control device.

Still another object of the invention is to provide a motor control device which can reduce a torque ripple while suppressing an increase in the size of a circuit board on which a driving circuit of a brushless motor is mounted. Additionally, a still further object of the invention is to provide an electric power steering device including such a motor control device.

Technical Solution

In a first invention, a motor control device for driving a brushless motor, the motor control device includes: a control calculation means which obtains a phase voltage instruction value showing a phase voltage to be applied to the brushless motor; a current detecting means which detects an electric current which flows into the brushless motor; a rotational position detecting means which detects the rotational position of a rotor in the brushless motor; a correction means which corrects the phase voltage instruction value based on the detection result of the current detecting means and the detection result of the rotational position detecting means so that a dependency of a ratio on an electric angle shown by a secondary harmonic component of the ratio concerning the electric angle of the brushless motor, the ratio being a ratio of a q-axis or d-axis component of the electric current, which flows into the brushless motor, to a q-axis or d-axis instruction value; and a driving means which drives the brushless motor based on the phase voltage instruction value after the correction by the correction means.

In a second invention, according to the first invention, the control calculation means calculates q-axis and d-axis components of a voltage to be applied to the brushless motor as q-axis and d-axis voltage instruction values, respectively, and converts the q-axis and d-axis voltage instruction values into phase components of the voltage to be applied to the brushless motor, thereby obtaining the phase voltage instruction value, and the correction means includes: a data acquisition means which calculates at least one of the ratio of the q-axis component of the electric current which flows into the brushless motor to a q-axis voltage instruction value, and the ratio of the d-axis component of the electric current which flows into the brushless motor to a d-axis voltage instruction value, based on the detection result of the current detecting means, and correlates the calculated ratio with the electric angle of the brushless motor based on the detection result of the rotational position detecting means so as to be stored as angle-dependent data; a correction coefficient determination means which determines a correction coefficient for correcting the phase voltage instruction value, based on the angle-dependent data, so that the dependency on the electric angle shown by the secondary harmonic component is reduced; and a correction execution means which corrects the phase voltage instruction value based on the correction coefficient determined by the correction coefficient determination means.

In a third invention, according to the first invention, the control calculation means determines q-axis and d-axis components of an electric current to flow to the brushless motor as q-axis and d-axis current instruction values, respectively, calculates the q-axis and d-axis components of the voltage to be applied to the brushless motors as q-axis and d-axis voltage instruction values, respectively, based on the q-axis and d-axis current instruction values, and converts the q-axis and d-axis voltage instruction values into phase components, respectively, of the voltage to be applied to the brushless motor, thereby obtaining the phase voltage instruction value, and the correction means includes: a data acquisition means which calculates at least one of the ratio of the q-axis component of the electric current which flows into the brushless motor to the q-axis current instruction value, and the ratio of the d-axis component of the electric current which flows into the brushless motor to the d-axis current instruction value, based on the detection result of the current detecting means, and correlates the calculated ratio with the electric angle of the brushless motor based on the detection result of the rotational position detecting means so as to be stored as angle-dependent data; a correction coefficient determination means which determines a correction coefficient for correcting the phase voltage instruction value, based on the angle-dependent data, so that the dependency on the electric angle shown by the secondary harmonic component is reduced; and a correction execution means which corrects the phase voltage instruction value based on the correction coefficient determined by the correction coefficient determination means.

In a fourth invention, according to the first invention, the correction means corrects the phase voltage instruction value so that the dependency on the electric angle shown by the secondary harmonic component is reduced, based on the detection values of the electric current and rotational position obtained by the current detecting means and the rotational position detecting means when the detection value of the electric current obtained by the current detecting means is smaller than a predetermined threshold value.

In a fifth invention, according to the first invention, the correction means corrects the phase voltage instruction value so that the dependency on the electric angle shown by the secondary harmonic component is reduced, based on the detection values of the electric current and rotational position obtained by the current detecting means and the rotational position detecting means when the angular velocity of the rotor of the brushless motor is equal to or lower than a predetermined threshold value.

In a sixth invention, an electric power steering device gives steering assist power to a steering mechanism of a vehicle by a brushless motor, and the electric power steering device includes: the motor control device according to any one of first to fifth inventions, wherein the motor control device drives the brushless motor which gives steering assist power to the steering mechanism.

According to the above first invention, the phase voltage instruction value is corrected so that the dependency of the q-axis or d-axis component of the electric current (motor current) which flows into the brushless motor on the electric angle is reduced. Thereby, the difference caused between phases as to the motor current by the difference (interphase resistance difference) of the resistance values between phases is reduced or eliminated, and the torque ripple generated in the brushless motor due to the interphase resistance difference is suppressed.

According to the above second invention, at least one of the ratio of the q-axis component of the electric current (motor current) which flows into the brushless motor to a q-axis voltage instruction value, and the ratio of the d-axis component of the motor current to a d-axis voltage instruction value is calculated, and the calculated ratio is correlated with the electric angle so as to be acquired as angle-dependent data. Since this angle-dependent data is data based on the ratio of the motor current to the voltage instruction value, the influence on the q-axis or d-axis component of the motor current caused by a change in an applied voltage to the brushless motor is removed, and the dependency of the q-axis or d-axis component of the motor current on the electric angle is appropriately shown. The phase voltage instruction value is corrected so that the dependency of the q-axis or d-axis component of the electric current which flows into the brushless motor on the electric angle is reduced based on such angle-dependent data. Accordingly, the torque ripple generated in the brushless motor due to the interphase resistance difference can be more reliably suppressed.

According to the above third invention, at least one of the ratio of the q-axis component of the electric current (motor current) which flows into the brushless motor to a q-axis current instruction value, and the ratio of the d-axis component of the motor current to a d-axis current instruction value is calculated, and the calculated ratio is correlated with the electric angle so as to be acquired as angle-dependent data. Since this angle-dependent data is data based on the ratio of the motor current to the current instruction value, the influence on the q-axis or d-axis component of the motor current caused by a change (or a change in the applied voltage corresponding thereto) in an electric current to be supplied to the brushless motor, i.e., a change in the current instruction value, is removed, and the dependency of the q-axis or d-axis component of the motor current on the electric angle is appropriately shown. The phase voltage instruction value is corrected so that the dependency of the q-axis or d-axis component of the electric current which flows into the brushless motor on the electric angle is reduced based on such angle-dependent data. Accordingly, the torque ripple generated in the brushless motor due to the interphase resistance difference can be more reliably suppressed.

According to the above fourth invention, the detection value of the motor current and the detection value of the rotational position of the rotor of the motor which are used to correct the phase voltage instruction value are acquired when the detection value of the motor current is smaller than a predetermined threshold value. That is, since the motor current is smaller than the threshold value, the current detection value and rotational position detection value for correction are acquired when an increase in the resistance value caused by generation of heat is small. Thereby, since the current detection value and rotational position detection value, which are acquired when the interphase resistance difference is relatively large compared to the resistance value, are used for correction of the phase voltage instruction value, the correction of compensating the interphase resistance difference with high precision becomes possible, and generation of the torque ripple resulting from the interphase resistance difference can be more reliably suppressed.

According to the fifth invention, the detection value of the motor current and the detection value of the rotational position of the rotor of the motor which are used to correct the phase voltage instruction value are acquired when the angular velocity of the rotor of the brushless motor is equal to or less than a predetermined threshold value. That is, the current detection value and the rotational position detection value are acquired when a counter-electromotive force is small, and applied voltages to respective phase resistances are comparatively large. By using such current detection value and rotational position detection value, the correction for compensating the interphase resistance difference with high precision becomes possible, and generation of the torque ripple resulting from the interphase resistance difference can be more reliably suppressed.

According to the above sixth invention, since generation of the torque ripple resulting from the interphase resistance difference is suppressed by correcting the phase voltage instruction value showing a voltage to be applied to the brushless motor which gives steering assist power, an electric power steering device with a favorable steering feel can be provided.

In a seventh invention, a motor control device for driving a brushless motor, the motor control device includes: a current detecting means which detects respective phase currents which flow into the brushless motor; a control calculation means which calculates instruction values showing respective phase voltages to be applied to the brushless motor, and outputs the instruction values as phase voltage instruction values; a phase resistance calculation means which calculates respective phase resistance values based on detection values of the respective phase currents detected by the current detecting means, and the instruction values of the respective phase voltages applied to the brushless motor at the time of the detection of the detection values; a correction means which corrects the phase voltage instruction values according to the respective phase resistance values calculated by the phase resistance calculation means; and a driving means which drives the brushless motor based on the phase voltage instruction values after correction by the correction means.

In a eighth invention, according to the seventh invention, the phase resistance calculation means calculates respective phase resistance values when the magnitude of the current which flows into the brushless motor is smaller than a predetermined value.

In a ninth invention, according to the seventh invention, a storage means which stores the phase voltage instruction values after the correction when the respective phase currents are detected by the current detecting means is further included, wherein the phase resistance calculation means calculates the respective phase resistance values based on the detection values of the respective phase currents detected by the current detecting means, and the phase voltage instruction values stored in the storage means.

In a tenth invention, according to the ninth invention, the current detecting means includes: a single current sensor which detects the electric current which flows through into the brushless motor; and a phase current calculation means which calculates the detection values of the respective phase currents sequentially, based on the detection value of the electric current detected by the current sensor, the control calculation means includes: an open-loop-control means which calculates the phase voltage instruction values according to the circuit equation of the brushless motor based on an instruction value showing an electric current to be supplied to the brushless motor, and the angular velocity of the rotor of the brushless motor; and a parameter calculation means which calculates the values of the parameters used when the phase voltage instruction values are calculated according to the circuit equation, based on the detection value of the electric current detected by the current sensor, and the storage means stores the phase voltage instruction values after correction whenever the detection value of any phase current is obtained by the phase current calculation means.

In a eleventh invention, an electric power steering device gives steering assist power to a steering mechanism of a vehicle by a brushless motor, and the electric power steering device includes: the motor control device according to any one of the seventh to tenth inventions, wherein the motor control device drives the brushless motor which gives steering assist power to the steering mechanism.

According to the above seventh invention, respective phase resistance values are calculated based on detection values of the respective phase currents detected by the current detecting means, and the instruction values of the respective phase voltages obtained by the control calculation means, and the instruction values of the respective phase voltages to be applied to the brushless motor are corrected according to the calculated respective phase resistance values, whereby the interphase resistance difference is compensated, and the torque ripple resulting from the interphase resistance difference is reduced.

According to the above eighth invention, when the magnitude of an electric current which flows into the brushless motor is smaller than a predetermined value, respective phase resistances are calculated, and at the time of this calculation, an increase in resistance value resulting from generation of heat caused by an electric current is small and the interphase resistance difference is relatively large. Thus, high-precision calculation values are acquired as to respective resistances. Thereby, since compensation of the interphase resistance differences by correction of the instruction values of the respective phase voltages is more accurately performed, the torque ripple can be sufficiently reduced.

According to the above ninth invention, the instruction values of the respective phase voltages applied to the brushless motor at the time of the detection of the respective phase currents are stored in the storage means, and the respective phase resistance values are calculated based on the detection values of the respective phase currents, and the instruction values of the respective phase voltages stored in the storage means. Accordingly, even in a case where electric currents of all phases cannot be detected since the number of a current sensor is only one, and respective phase current detection values are sequentially obtained based on the current detection value obtained by the current sensor, the torque ripple can be reduced by calculating respective phase resistance values, and correcting the instruction values of the respective phase voltages according to the respective phase resistance values.

According to the above tenth invention, the values of the parameters to be used when the instruction values of the respective phase voltages are obtained, are obtained on the basis on the detection value of the electric current detected by the single current sensor, and the instruction values of the respective phase voltages are corrected according to the respective phase resistance values calculated based on the detection values of the respective phase currents sequentially obtained by the current detecting means including a single current sensor, and the instruction values of the respective phase voltages stored in the storage means. Thereby, while the costs or consumed electric current are suppressed compared to a case where a plurality of current sensors are used, the brushless motor can be driven with high precision even when the values of the above parameters fluctuate due to manufacturing variations, temperature change, or the like, and motor output with a suppressed torque ripple can be obtained.

According to the above eleventh invention, since generation of the torque ripple resulting from the interphase resistance difference is suppressed by correcting the instruction values of the respective phase voltages showing a voltage to be applied to the brushless motor which gives steering assist power, an electric power steering device with a favorable steering feel can be provided.

In a twelfth invention, a motor control device for driving a brushless motor, includes: a control calculation means which obtains instruction values showing respective phase voltages to be applied to the brushless motor, and outputs the instruction values as phase voltage instruction values; a correction means which corrects the phase voltage instruction values; and a driving means which drives the brushless motor based on the phase voltage instruction values after correction by the correction means, wherein the driving means is adapted such that switching element pairs including two switching elements mutually connected in series are connected in parallel between a power supply terminal and a grounding terminal by the number of phases, and includes an inverter in which a connection point between the two switching elements corresponding to each phase is connected to the brushless motor as an output end, and wherein the correction means corrects the phase voltage instruction values for every phase according to the phase voltage instruction values so that the deviation of a voltage at the output end caused by the difference between a resistance component of a path from the power supply terminal to the output end of the inverter and a resistance component of a path from the output end to the grounding terminal is compensated.

In a thirteenth invention, according to the twelfth invention, the correction means includes: a storage means which stores a correction map showing the correspondence relationship between the instruction values of phase voltages to be applied to the brushless motor, and the amounts of correction for every phase; and a correction operation means which corrects the phase voltage instruction values for every phase according to the amounts of correction correlated with the phase voltage instruction values output from the control calculation means by the correction map, thereby calculating the phase voltage instruction values after correction.

In a fourteenth invention, an electric power steering device gives steering assist power to a steering mechanism of a vehicle by a brushless motor, and the electric power steering device includes: the motor control device according to the twelfth or thirteenth invention, wherein the motor control device drives the brushless motor which gives steering assist power to the steering mechanism.

According to the above twelfth invention, the phase voltage instruction values are corrected for every phase according to the phase voltage instruction values showing voltages to be applied to the brushless motor. Thereby, even in a case where there is a difference in the upper stage arm resistance which is a resistance component of the path from the power supply terminal to the output end of the inverter, and the lower stage arm resistance which is a resistance component of the path from the output end to the grounding terminal, the phase voltages according to the phase voltage instruction values are applied to the brushless motor with high precision. This suppresses generation of the torque ripple resulting from the difference between the upper stage arm resistance and the lower stage arm resistance in the inverter. Additionally, the phase voltage instruction values showing voltages to be applied to the brushless motor are corrected for every phase so that the voltage deviation at the output end of the inverter is compensated. Thus, even in a case where the interphase resistance difference exists, the interphase imbalance between phase voltages applied to the brushless motor is suppressed. Thereby, generation of the torque ripple resulting from the interphase resistance difference can also be reduced. Accordingly, when a circuit pattern is formed so that the resistance components are aligned between the upper stage arm and lower stage arm of the inverter or between phases in order to reduce the torque ripple, an increase in the size of the circuit board of the inverter is caused. However, according to the above first invention, the torque ripple can be reduced to suppress an increase in the size of the circuit board by correcting the phase voltage instruction values as described above.

According to the above thirteenth invention, a correction map showing the correspondence relationship between the instruction values of phase voltages to be applied to the brushless motor, and the amounts of correction is prepared for every phase. Thus, the same effects as those of the above first invention are obtained by correcting the phase voltage instruction values for every phase based on the correction map. In addition, such a correction map can be made by computer simulation regarding a system including a brushless motor and a motor control device, or simple calculation based on an equivalent circuit for one phase regarding a motor/driving circuit system. That is, the voltage deviation (or relationship between the duty ratio of the inverter, and voltage deviation) at the output end of each phase of the inverter can be obtained by the computer simulation or the simple calculation based on the equivalent circuit, using design values or actual measurements of the upper stage arm resistance and lower stage arm resistance for each phase of the inverter, or the phase resistance of the brushless motor, and the correction map can be made based on the voltage deviation or the like.

According to the above fourth invention, since the torque ripple can be reduced while suppressing an increase in the size of the circuit board of the inverter for driving the brushless motor, steering feel can be improved while meeting the demand for miniaturization, high efficiency, or the like in the electric power steering device.

BRIEF DESCRIPTION OF THE DRAWINGS

FIG. 6 is a view for explaining a specific example of the correction in the above first embodiment.

FIG. 15 is a circuit diagram showing an equivalent circuit for one phase for obtaining voltage deviation required for the making of the correction map in the above embodiment.

BEST MODE FOR CARRYING OUT THE INVENTION

1. Electric Power Steering Device

Figure 1:
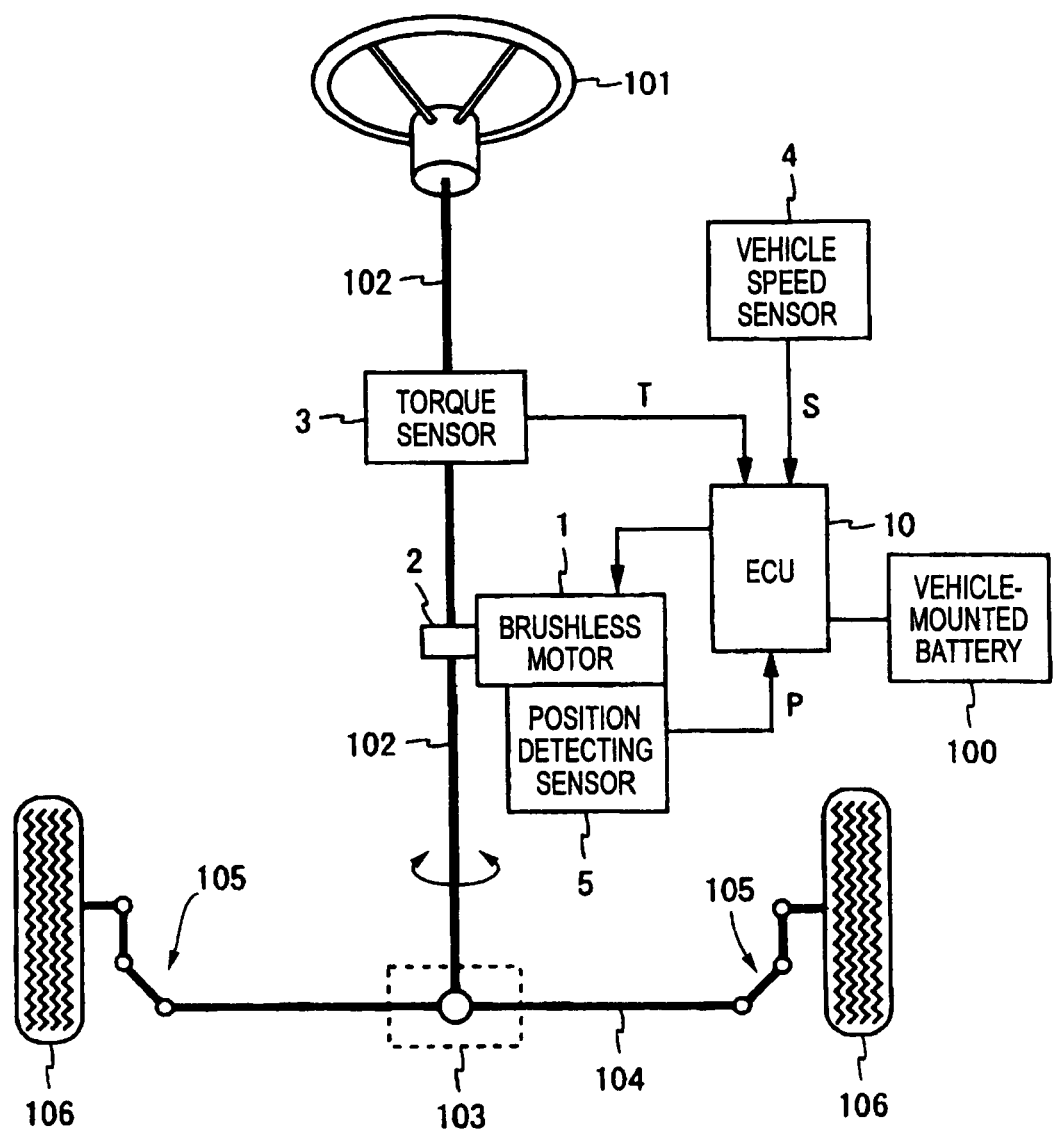
FIG. 1 is a block diagram showing the configuration of an electric power steering device related to an embodiment of the invention.

FIG. 1 is a schematic diagram showing the configuration of an electric power steering device related to an embodiment of the invention, along with the configuration of a vehicle associated therewith. The electric power steering device shown in FIG. 1 is a column assist type electric power steering device including a brushless motor 1, a reducer 2, a torque sensor 3, a vehicle speed sensor 4, a position detecting sensor 5, and an electronic control unit (hereinafter referred to as ECU) 10.

As shown in FIG. 1, a handle (steering wheel) 101 is secured to one end of a steering shaft 102, and the other end of the steering shaft 102 is connected to a rack shaft 104 via a rack-and-pinion mechanism 103. Both ends of the rack shaft 104 are connected to wheels 106 via connecting members 105 including a tie rod and a knuckle arm. When a driver rotates the handle 101, the steering shaft 102 rotates, and the rack shaft 104 reciprocates with this rotation. The direction of the wheels 106 changes with the reciprocating motion of the rack shaft 104.

The electric power steering device performs steering assist shown below, in order to alleviate a burden to a driver. The torque sensor 3 detects steering torque T applied to the steering shaft 102 through the operation of the handle 101. The vehicle speed sensor 4 detects vehicle speed S. The position detecting sensor 5 detects the rotational position P of a rotor of the brushless motor 1. The position detecting sensor 5 is constituted by, for example, a resolver.

The ECU 10 receives supply of electric power from a vehicle-mounted battery 100, and drives the brushless motor 1 based on the steering torque T, the vehicle speed S, and the rotational position P. When the brushless motor 1 is driven by the ECU 10, steering assist power is generated. The reducer 2 is provided between the brushless motor 1 and the steering shaft 102. The steering assist power generated by the brushless motor 1 acts so as to rotate the steering shaft 102 via the reducer 2.

As a result, the steering shaft 102 is rotated by both the steering torque applied to the handle 101, and the steering assist power generated in the brushless motor 1. In this way, the electric power steering device gives the steering assist power generated by the brushless motor 1 to a steering mechanism of the vehicle, thereby performing steering assist.

The electric power steering device related to the embodiment of the invention has the feature in a control device (motor control device) which drives the brushless motor 1. Thus, the motor control device included in the electric power steering device related to respective embodiments will be described below.

2. Second Embodiment

Figure 2:
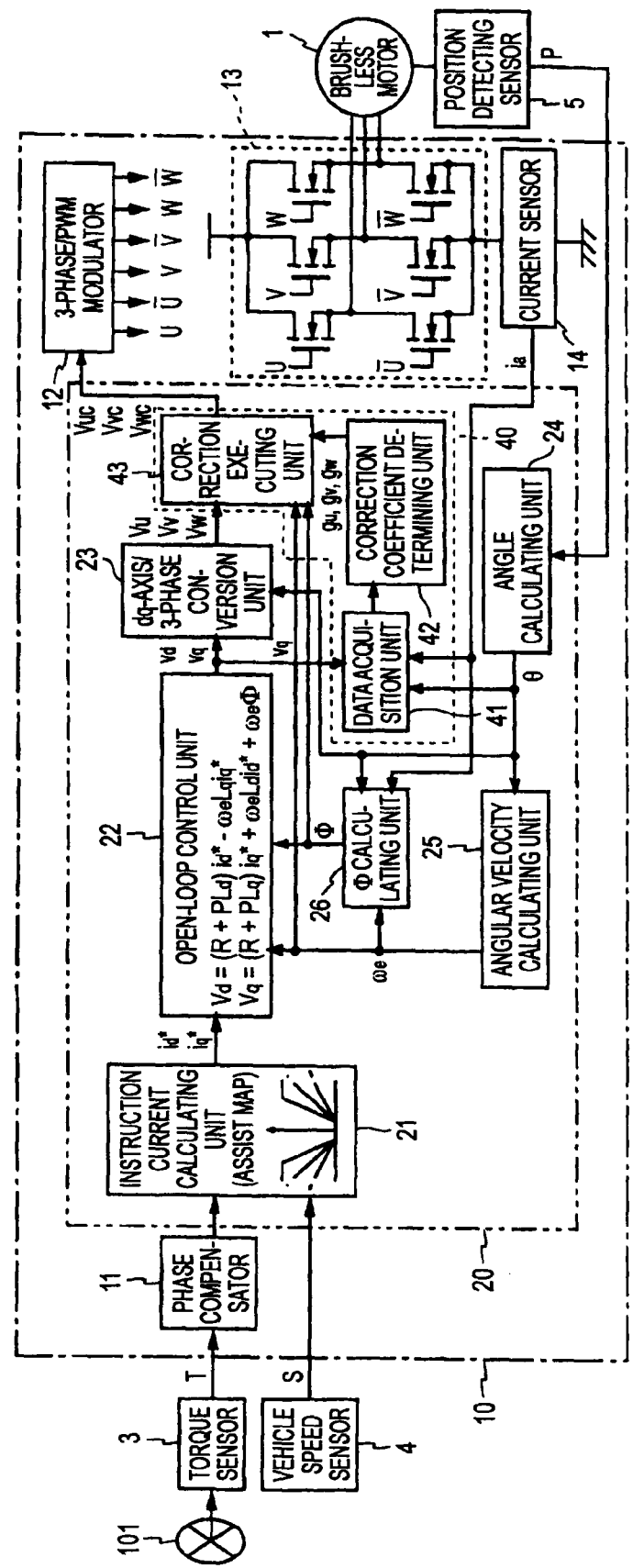
FIG. 2 is a block diagram showing the configuration of a motor control device related to a first embodiment of the invention.

FIG. 2 is a block diagram showing the configuration of the motor control device related to the first embodiment of the invention. The motor control device shown in FIG. 2 is configured using the ECU 10, and drives the brushless motor 1 which has windings (not shown) of three phases including u-phase, v-phase, and w-phase. The ECU 10 includes a phase compensator 11, a microcomputer (hereinafter abbreviated as a microcomputer) 20, a 3-phase/PWM (Pulse Width Modulation) modulator 12, a motor drive circuit 13, and a current sensor 14.

The steering torque T output from the torque sensor 3, the vehicle speed S output from the vehicle speed sensor 4, and the rotational position P output from the position detecting sensor 5 are input to the ECU 10. The phase compensator 11 performs phase compensation on the steering torque T. The microcomputer 20 functions as a control means which calculates a voltage instruction value used for the driving of the brushless motor 1. The functions of the microcomputer 20 will be described below in detail.

The 3-phase/PWM modulator 12, and the motor drive circuit 13 are constituted by hardware (circuits), and function as a motor driving means which drives the brushless motor 1, using the voltage of the voltage instruction value obtained by the microcomputer 20. The 3-phase/PWM modulator 12 creates three kinds of PWM signals (U, V, and W shown in FIG. 2) which have duty ratios according to 3-phase voltage instruction values obtained by the microcomputer 20. The motor drive circuit 13 is a PWM voltage type inverter circuit including six MOS-FETs (Metal Oxide Semiconductor Field Effect Transistor) as switching elements. The six MOS-FETs are controlled by three kinds of PWM signals and negative signals thereof. By controlling the conduction state of the MOS-FETs using the PWM signals, 3-phase driving currents (a u-phase current, a v-phase current, and a w-phase current) are supplied to the brushless motor 1.

The current sensor 14 functions as a current detecting means which detects an electric current which flows into the brushless motor 1. The current sensor 14 is constituted by, for example, a resistor and a Hall device, and only one current sensor is provided between the motor drive circuit 13 and a power source. In the example shown in FIG. 2, the current sensor 14 is provided between the motor drive circuit 13 and the minus side (grounding) of a power source. However, the current sensor 14 may be provided between the motor drive circuit 13 and the plus side of the power source.

While the brushless motor 1 is rotating, a current value detected by the current sensor 14 changes according to a PWM signal. Within one cycle of a PWM signal, a one-phase driving current may be detected by the current sensor 14, and the sum of two-phase driving currents may be detected by the current sensor. Since the sum of 3-phase driving currents becomes zero, the remaining one-phase driving current can be obtained based on the sum of the two-phase driving currents. Accordingly, while the brushless motor 1 is rotating, 3-phase driving currents can be detected using one current sensor 14. A current value $i_a$ detected by the current sensor 14 is input to the microcomputer 20.

The microcomputer 20 executes programs stored in a memory (not shown) built in the ECU 10, thereby functioning as an instruction current calculating unit 21, an open-loop control unit 22, a dq-axis/3-phase conversion unit 23, an angle calculating unit 24, an angular velocity calculating unit 25, a $\Phi$ calculating unit 26, a data acquisition unit 41, a correction coefficient determining unit 42, and a correction executing unit 43. In addition, the instruction current calculating unit 21, the open-loop control unit 22, and the dq-axis/3-phase conversion unit 23 constitute a control calculation means which calculates a phase voltage instruction value used in order to drive the brushless motor 1.

The microcomputer 20, as shown below, obtains voltage instruction values showing voltages to be given to the motor drive circuit 13, according to circuit equations of the motor, based on current instruction values showing the number of electric currents to be supplied to the brushless motor 1, and the angular velocity of the rotor of the brushless motor 1.

Figure 3:
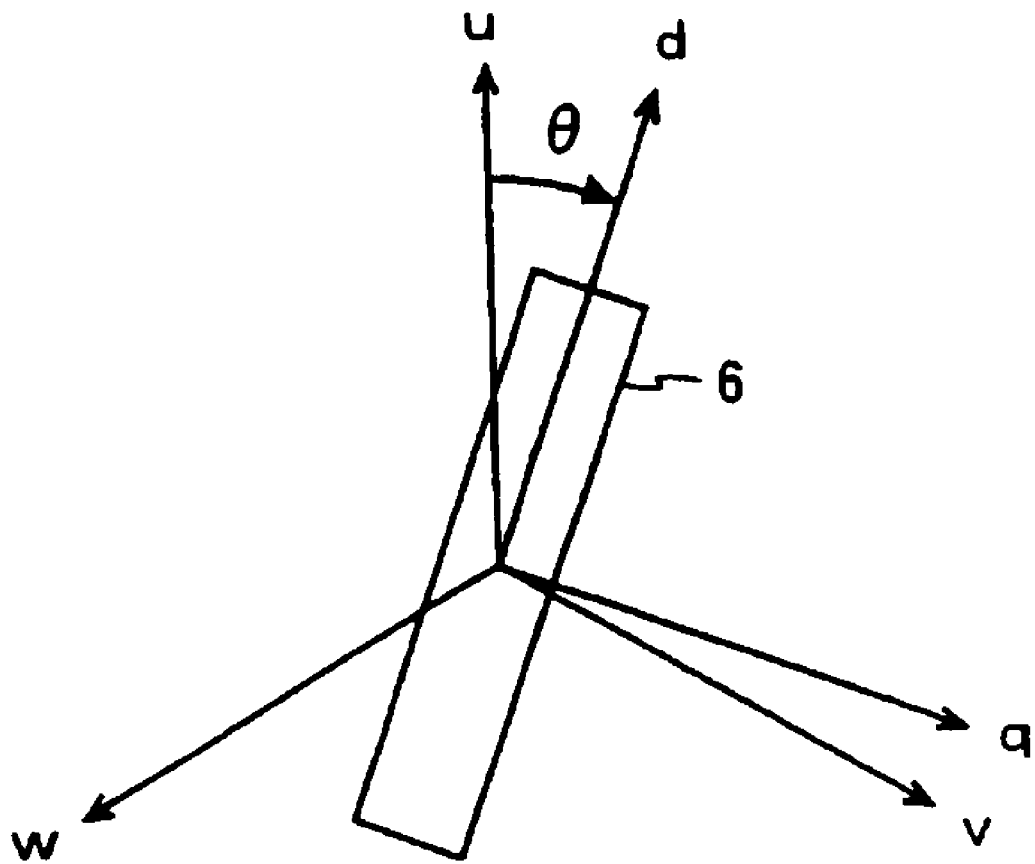
FIG. 3 is a view showing a 3-phase alternating-current coordinate and a dq coordinate in a 3-phase brushless motor.

The angle calculating unit 24 obtains the rotational angle (hereinafter referred to an angle θ) of the rotor of the brushless motor 1 based on the rotational position P detected by the position detecting sensor 5. The angular velocity calculating unit 25 obtains the angular velocity $\omega_e$ of the rotor of the brushless motor 1 based on the angle θ. In addition, when a u-axis, a v-axis, and a w-axis are set for the brushless motor 1 as shown in FIG. 3, and a d-axis and a q-axis are set for the rotor 6 of the brushless motor 1, the angle formed by the u-axis and the d-axis becomes the angle θ. That is, in the angle calculating unit 24, an electric angle θ in the brushless motor 1 is obtained.

The instruction current calculating unit 21 obtains the d-axis component and q-axis component (hereinafter, the former value is referred to as a d-axis current instruction value $i_d{}^*$ and the latter value is referred to as a q-axis current instruction value $i_q{}^*$) of an electric current to be supplied to the brushless motor 1 based on the steering torque T (an output signal of the phase compensator 11) and the vehicle speed S after phase compensation. In more detail, the instruction current calculating unit 21 has built therein a table (hereinafter referred to as an assist map) which stores the correspondence between the steering torque T and instruction currents, with the vehicle speed S as a parameter, and obtains a current instruction value with reference to the assist map. By using the assist map, when a certain magnitude of steering torque has been given, it is possible to obtain the d-axis current instruction value $i_d{}^*$ and q-axis current instruction value $i_q{}^*$ showing an electric current to be supplied to the brushless motor 1 in order to generate an appropriate magnitude of steering assist power according to the magnitude.

In addition, the q-axis current instruction value $i_q{}^*$ obtained by the instruction current calculating unit 21 is a current value with a sign, and the sign shows the direction of the steering assist. For example, when the sign is plus, the steering assist for right turning is performed, and when the sign is minus, the steering assist for left turning is performed. Additionally, the d-axis current instruction value $i_d{}^*$ is typically set to zero.

The open-loop control unit 22 obtains the d-axis component and q-axis component (hereinafter the former value is referred to as a d-axis voltage instruction value $v_d$ and the latter value is referred to as a q-axis voltage instruction value $v_q$) of a voltage to be applied to the brushless motor 1 based on the d-axis current instruction value $i_d{}^*$, the q-axis current instruction value $i_q{}^*$, and the angular velocity $\omega_e$. The d-axis voltage instruction value $v_d$ and the q-axis voltage instruction value $v_q$ are calculated using circuit equations of a motor shown in the following Equations (1) and (2).

$$v_d = (R + PL_d)i_d{}^* - \omega_e L_q i_q{}^* \tag{1}$$

$$v_q = (R + PL_q)i_q{}^* + \omega_e L_d i_d{}^* + \omega_e \Phi \tag{2}$$

Here, in Equations (1) and (2), $v_d$ is the d-axis voltage instruction value, $v_q$ is the q-axis voltage instruction value, $i_d{}^*$ is the d-axis current instruction value, $i_q{}^*$ is the q-axis current instruction value, $\omega_e$ is the angular velocity of the rotor, R is a circuit resistance including an armature winding resistance, $L_d$ is the self-inductance of the d-axis, $L_q$ is the self-inductance of the q-axis, $\Phi$ is a $\sqrt{(3/2)}$ multiple of a maximum value of the number of U, V, and W-phase armature winding interlinking magnetic fluxes, and P is a differential operator. Among these, R, $L_d$, $L_q$, and $\Phi$ are treated as known parameters. In addition, the wiring resistance between the brushless motor 1 and the ECU 10, the resistance and wiring resistance of the motor drive circuit 13 within the ECU 10, or the like are included in the circuit resistance shown by R. This point is also the same in the other embodiments.

The dq-axis/3-phase conversion unit 23 converts the d-axis voltage instruction value $v_d$ and the q-axis voltage instruction value $v_q$ which are calculated by the open-loop control unit 22 into voltage instruction values on 3-phase alternating-current coordinate axes. In more detail, the dq-axis/3-phase conversion unit 23 obtains a u-phase voltage instruction value $V_u$, a v-phase voltage instruction value $V_v$, and a w-phase voltage instruction value $V_w$, using the following Equations (3) to (5) based on the d-axis voltage instruction value $v_d$ and the q-axis voltage instruction value $v_q$.

$$V_u = \sqrt{(2/3)} \times \{v_d \times \cos\theta - v_q \times \sin\theta\} \qquad (3)$$

$$V_v = \sqrt{(2/3)} \times \{v_d \times \cos(\theta - 2\pi/3) - v_q \times \sin(\theta - 2\pi/3)\} \qquad (4)$$

$$V_w = -V_u - V_v \qquad (5)$$

The angle $\theta$ included in the above Equations (3) and (4) is an electric angle obtained in the angle calculating unit 24. In addition, the u-phase voltage instruction value $V_u$, the v-phase voltage instruction value $V_v$, and the w-phase voltage instruction value $V_w$ are generically called "phase voltage instruction values $V_u$, $V_v$, and $V_w$."

The current value $i_a$ detected by the current sensor 14, and the electric angle $\theta$ calculated by the angle calculating unit 24, and the q-axis voltage instruction value $v_q$ calculated by the open-loop control unit 22 are input to the data acquisition unit 41. The data acquisition unit 41 first obtains u-phase and v-phase currents (hereinafter, the former value is referred to as a u-phase current detection value $i_u$ and the latter value is referred to as a v-phase current detection value $i_v$) which flow into the brushless motor 1 based on the current value $i_a$, and converts these currents into current values on dq coordinate axes. In more detail, the data acquisition unit 41 obtains the q-axis current detection value $i_q$, using the following Equation (6) based on the u-phase current detection value $i_u$ and the v-phase current detection value $i_v$.

$$i_q = \sqrt{2} \times \{i_v \times \cos\theta - i_u \times \cos(\theta - 2\pi/3)\} \qquad (6)$$

Next, the data acquisition unit 41 obtains the ratio $i_q/v_q$ of the above q-axis current detection value $i_q$ to the q-axis voltage instruction value $v_q$ (hereinafter referred to as a "relative voltage q-axis current gain value" or a "q-axis current gain value") when $v_q \neq 0$, and stores this q-axis current gain value $i_q/V_q$ in the data acquisition unit 41 so as to correspond to the electric angle $\theta$ calculated by the angle calculating unit 24 at the time of current detection in the current sensor 14. In this way, whenever the q-axis current gain value $i_q/v_q$ is calculated, the data acquisition unit 41 stores the q-axis current gain value $i_q/v_q$ so as to correspond to the electric angle at this time. Thereby, data (hereinafter referred to as "angle-dependent data") showing the q-axis current gain value $i_q/v_q$ to various electric angles $\theta$ of 0 to 360 degrees is obtained in the data acquisition unit 41. In addition, as will be described later, since the dependency of the q-axis current on the electric angle $\theta$ is based on a secondary harmonic component, the range of the electric angle $\theta$ when the angle-dependent data is acquired may be a range narrower than 0 to 360 degrees, for example, a range of 90 to 270 degrees (this point is also the same in the modifications and other embodiments which will be described later).

The correction coefficient determining unit 42 determines correction coefficients $g_u$, $g_v$, and $g_w$ for correcting the phase voltage instruction values $v_u$, $v_v$, and $v_w$, respectively, as will be described later, in the correction executing unit 43, based on the angle-dependent data obtained as described above.

The above correction coefficients $g_u$, $g_v$, $g_w$, and the armature winding interlinking magnetic flux number $\Phi$ calculated by the $\Phi$ calculating unit 26, and the angular velocity $\omega_e$ calculated by the angular velocity calculating unit 25 are input to the correction executing unit 43, and the correction executing unit 43 corrects the phase voltage instruction values $V_u$, $V_v$, and $V_w$ according to the following Equations (7) to (9).

$$V_{uc} = (V_u - e_u) \cdot g_u + e_u \qquad (7)$$

$$V_{vc} = (V_v - e_v) \cdot g_v + e_v \qquad (8)$$

$$V_{wc} = (V_w - e_w) \cdot g_w + e_w \qquad (9)$$

In the above Equations (7) to (9), $e_u$, $e_v$, and $e_w$ are respectively u-phase, v-phase, and w-phase counter-electromotive forces (induced voltages) in the brushless motor 1. Meanwhile, the q-axis component of a counter-electromotive force of the brushless motor 1 is $\omega_e \Phi$, and the d-axis component is 0. Thus, the correction executing unit 43 converts the d-axis components and q-axis components of these counter-electromotive forces into counter-electromotive forces on the 3-phase alternating-current coordinate axes by the following Equations (10) to (12), and calculates the phase voltage instruction value $V_{uc}$, $V_{vc}$, and $V_{wc}$ after correction, according to the above Equation (7) to (9), using the respective phase counter-electromotive forces $e_u$, $e_v$ and $e_w$ acquired by the conversion.

$$e_u = \sqrt{(2/3)} \times \{0 \times \cos\theta - \omega_e \Phi \times \sin\theta\} \qquad (10)$$

$$e_v = \sqrt{(2/3)} \times \{0 \times \cos(\theta - 2\pi/3) - \omega_e \Phi \times \sin(\theta - 2\pi/3)\} \qquad (11)$$

$$e_w = -e_u - e_v \qquad (12)$$

In addition, the angle $\theta$ included in the above equations (10) and (11) is an electric angle obtained by the angle calculating unit 24.

In this way, the microcomputer 20 performs the processing of obtaining the current instruction values $i_d^*$ and $i_q^*$ on the dq coordinate axes, the processing of obtaining the voltage instruction values $v_d$ and $v_q$ on the dq coordinate axes according to the circuit equations of the motor, the processing of converting the d-axis and q-axis voltage instruction values $v_d$ and $v_q$ into the phase voltage instruction values $V_u$, $V_v$, and $V_w$, and the processing of correcting the phase voltage instruction values $V_u$, $V_v$, and $V_w$. The 3-phase/PWM modulator 12 outputs three kinds of PWM signals based on the phase voltage instruction values $V_{uc}$, $V_{vc}$, and $V_{wc}$ after correction which have been obtained by the microcomputer 20. Thereby, a sinusoidal current according to the respective phase voltage instruction values $V_{uc}$, $V_{vc}$, and $V_{wc}$ after correction flows into the 3-phase windings of the brushless motor 1, and the rotor of the brushless motor 1 rotates. Along with this rotation, the torque according to the current which flows through the brushless motor 1 is generated in a rotary shaft of the brushless motor 1. The generated torque is used for the steering assist.

The current value $i_a$ detected by the current sensor 14, and the electric angle $\theta$ calculated by the angle calculating unit 24, and the angular velocity $\omega_e$ calculated by the angular velocity calculating unit 25 are input to the $\Phi$ calculating unit 26. The $\Phi$ calculating unit 26 first obtains u-phase and v-phase currents (hereinafter, the former value is referred to as a u-phase current detection value $i_u$ and the latter value is referred to as a v-phase current detection value $i_v$) which flow into the brushless motor 1 based on the current value $i_a$, and converts these currents into current values on the dq coordinate axes, using the following Equation (13) and (14), thereby obtaining the d-axis current detection value $i_d$ and the q-axis current detection value $i_q$.

$$I_d = \sqrt{2} \times \{i_v \times \sin\theta - i_u \times \sin(\theta - 2\pi/3)\} \quad (13)$$

$$i_q = \sqrt{2} \times \{i_v \times \cos\theta - i_u \times \cos(\theta - 2\pi/3)\} \quad (14)$$

Next, the Φ calculating unit 26 obtains the armature winding interlinking magnetic flux number Φ included in Equation (2), using the following Equation (15) based on the q-axis voltage instruction value $v_q$, the d-axis current detection value $i_d$, the q-axis current detection value $i_q$, and the angular velocity $\omega_e$ when $\omega_e \neq 0$.

$$\Phi = \{v_q - (R + PL_q)i_q - \omega_e L_d i_d\}/\omega_e \quad (15)$$

In addition, Equation (15) assigns the d-axis current detection value $i_d$ and the q-axis current detection value $i_q$ to the d-axis current instruction value $i_d^*$ and q-axis current instruction value $i_q^*$ of Equation (2), and solves the Equation for Φ.

The Φ calculating unit 26 outputs the calculated Φ value to the open-loop control unit 22. The open-loop control unit 22 uses the Φ value calculated by the Φ calculating unit 26, when the q-axis voltage instruction value $v_q$ is obtained using Equation (2). In this way, the microcomputer 20 obtains the armature winding interlinking magnetic flux number Φ included in the circuit equations of the motor, and uses the Φ value when the q-axis voltage instruction value $v_q$ is obtained.

The Φ calculating unit 26 may calculate the Φ value with arbitrary timing, as long as $\omega_e \neq 0$. The Φ calculating unit 26, for example, may obtain the Φ value at predetermined intervals, may obtain the Φ value once after the start of driving of the brushless motor 1, or may obtain the Φ value when the state of temperature or the like has changed. Additionally, when $\omega_e$ is close to zero, an error is apt to occur in the obtained Φ value. Thus, the Φ calculating unit 26 may obtain the Φ value only when the $\omega_e$ is equal to or more than a predetermined threshold value.

As shown above, the motor control device related to this embodiment obtains the voltage instruction values by the open loop control rotor according to the circuit equation, based on the current instruction value and the angular velocity of the of the motor, obtains the Φ included in the circuit equations of the motor based on the current values detected by the current sensor, and uses the Φ value when the voltage instruction values are obtained. Accordingly, according to the motor control device related to this embodiment, even when the Φ value included in the circuit equations of the motor fluctuates due to manufacturing variations or a temperature change, the brushless motor can be driven with high precision to obtain a desired motor output by obtaining the Φ value based on the current values detected by the current sensor.

Additionally, the motor control device related to this embodiment is provided with only one current sensor. Therefore, according to the motor control device related to this embodiment, miniaturization, low cost, and low power consumption of the motor control device can be achieved by reducing current sensors. Moreover, since the motor control device related to this embodiment performs the open loop control, control of the motor does not become discontinuous unlike a motor control device which performs feedback control using one current sensor. Therefore, according to the motor control device related to this embodiment, sound or vibration can be suppressed.

<2.1 Principle of Correction>

In this embodiment, in order to correct the phase voltage instruction values $V_u$, $V_v$, and $V_w$ so as to suppress generation of a torque ripple resulting from a difference (hereinafter, this difference is referred to as an "interphase resistance difference") between u-phase, v-phase, and w-phase regarding the value of a circuit resistance including an armature winding resistance, a correction unit 40 is provided. The correction unit 40 is constituted by the data acquisition unit 41, the correction coefficient determining unit 42, and the correction executing unit 43 as stated earlier, and the correction executing unit 43 corrects the phase voltage instruction values $V_u$, $V_v$, and $V_w$, using the correction coefficients $g_u$, $g_v$, and $g_w$ obtained by the data acquisition unit 41 and the correction coefficient determining unit 42, according to Equations (7) to (9) as mentioned earlier. Hereinafter, correction of such phase voltage instruction values $V_u$, $V_v$, and $V_w$ will be described with reference to FIGS. 4 to 6.

Figure 4:
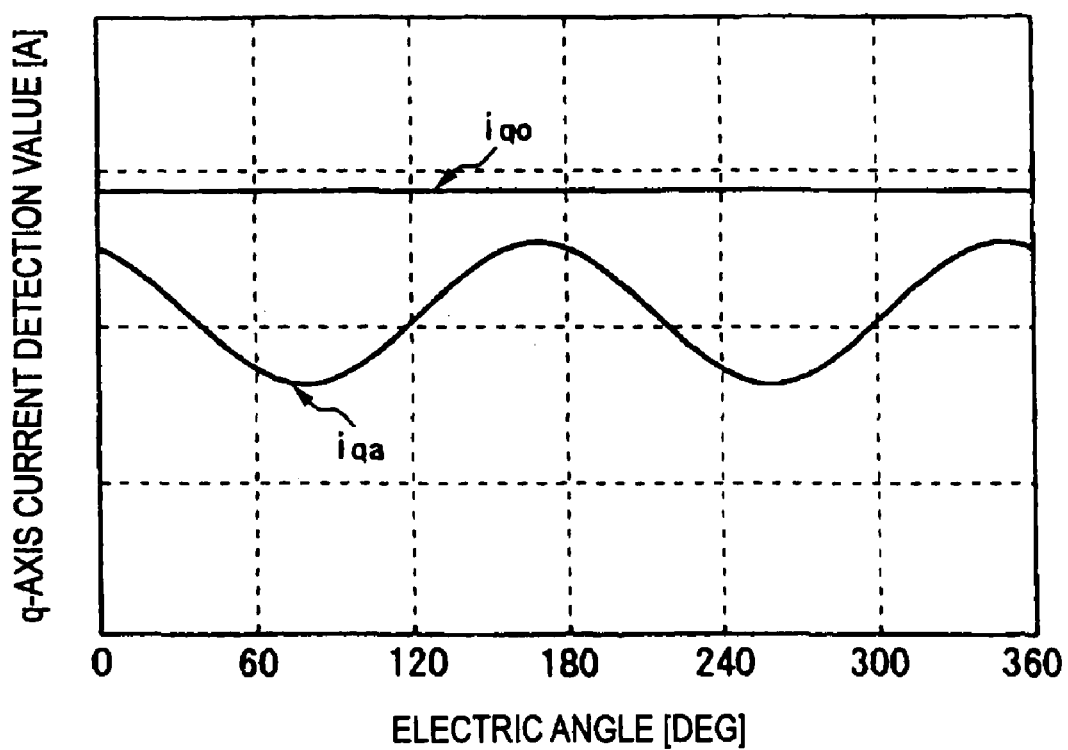
FIG. 4 is a view for explaining the principle of correction of a phase voltage instruction value in the above first embodiment.

FIG. 4 is a view for explaining this principle of correction, and shows the relationship between the q-axis current which is the q-axis component of an electric current which flow into the brushless motor 1, and the electric angle θ. In more detail, the relationship between a q-axis current $i_{qo}$ and the electric angle θ in a case where there is no interphase resistance difference, and the relationship between a q-axis current $i_{qa}$ and the electric angle θ in a case where there is an interphase resistance difference are shown. Now, circuit resistances including armature winding resistances regarding u-phase, v-phase, and w-phase are referred to as a "u-phase resistance", a "v-phase resistance", and a "w-phase resistance", respectively, (or collectively and generically referred to as a "phase resistance"), and are shown by symbols "$R_u$", "$R_v$", and "$R_w$", respectively. Additionally, the values of the u-phase resistance, the v-phase resistance, and the w-phase resistance are shown by symbols "$R_u$", "$R_v$", and "$R_w$", respectively.

As shown in FIG. 4, the q-axis current $i_{qo}$ in a case where there is no resistance difference between the phase resistances $R_u$, $R_v$, and $R_w$ ($R_u = R_v = R_w$), that is, in a case where there is no interphase resistance difference becomes a constant value (fixed) regardless of the electric angle θ. On the other hand, the q-axis current $i_{qa}$ in a case where there is an interphase resistance difference depends on the electric angle θ. In more detail, the q-axis current $i_{qa}$ in a case where there is an interphase resistance difference, as shown in FIG. 4, includes a secondary harmonic component regarding the electric angle θ. This is because, even if the amplitudes of (sinusoidal) u, v and w-phase voltages (sine wave shape) to be applied to the brushless motor 1 are the same, since the amplitudes between the u, v, and w-phase currents $i_u$, $i_v$, and $i_w$ which flow into the brushless motor 1 are different in a case where there is an interphase resistance difference, the q-axis current $i_q$ acquired from Equation (6) is not fixed to a constant value but includes a secondary harmonic component regarding the electric angle θ. The amplitude and phase angle of this secondary harmonic component differ according to the magnitude relationship of resistance values between the phase resistances $R_u$, $R_v$, and $R_w$.

Accordingly, by correcting the phase voltage instruction values $V_u$, $V_v$, and $V_w$ according to the phase angle of the q-axis current $i_q$ in the brushless motor 1, the dependency of the q-axis current $i_q$ on the electric angle can be reduced or eliminated, and thereby generation of a torque ripple resulting from the interphase resistance difference can be suppressed. The correction unit 40 in this embodiment corrects the phase voltage instruction values $V_u$, $V_v$, and $V_w$ in order to suppress the torque ripple based on such a principle. Hereinafter, this correction method will be described in detail.

<2.2 Correction Method>

In this embodiment, as mentioned earlier, the data acquisition unit 41 of the correction unit 40 obtains the q-axis current gain value $i_q/v_q$ which is the ratio of the q-axis current detection value $i_q$ to the q-axis voltage instruction value $v_q$, regarding various electric angles θ, and the data showing the q-axis current gain value $i_q/v_q$ to various electric angles θ of 0 to 360 degrees is stored as the angle-dependent data in the data acquisition unit 41. Here, the data showing not the q-axis current detection value $i_q$ but the q-axis current gain value $i_q/v_q$ is stored in order to remove the influence on the q-axis current caused by a change in the voltage applied to the brushless motor 1, thereby appropriately acquiring the data showing the dependency of the q-axis current to the electric angle θ.

In the correction coefficient determining unit 42 of the correction unit 40, an electric angle (hereinafter referred to as a "peak electric angle") θp at which the q-axis current gain value $i_q/v_q$ becomes the greatest is obtained based on the angle-dependent data acquired as described above, and the correction coefficients $g_u$, $g_v$, and $g_w$ in Equations (7) to (9) as mentioned earlier are determined according to the peak electric angle θp. In addition, although two peaks exist in a secondary harmonic component regarding the electric angle θ included in the q-axis current gain value $i_q/v_q$ within a range of θ=0 to 360 degrees, the peak electric angle θp included within a range of θ=90 to 270 degrees is used for the determination of the correction coefficients $g_u$, $g_v$, and $g_w$ in this embodiment. Here, the range of the electric angle θ used for the determination of the correction coefficients $g_u$, $g_v$, and $g_w$ is not limited thereto. Additionally, as can be understood from Equations (7) to (9) as mentioned earlier, when the value of the correction coefficient $g_x$ (x=u, v, and w) is 1, (the amplitude of) an applied voltage to the resistance $R_x$ of a relevant phase is the same as that before correction, and when the value of the correction coefficient $g_x$ (x=u, v, and w) is greater than 1, (the amplitude of) an applied voltage to the resistance $R_x$ of a relevant phase becomes greater than that before correction.

Figure 5:
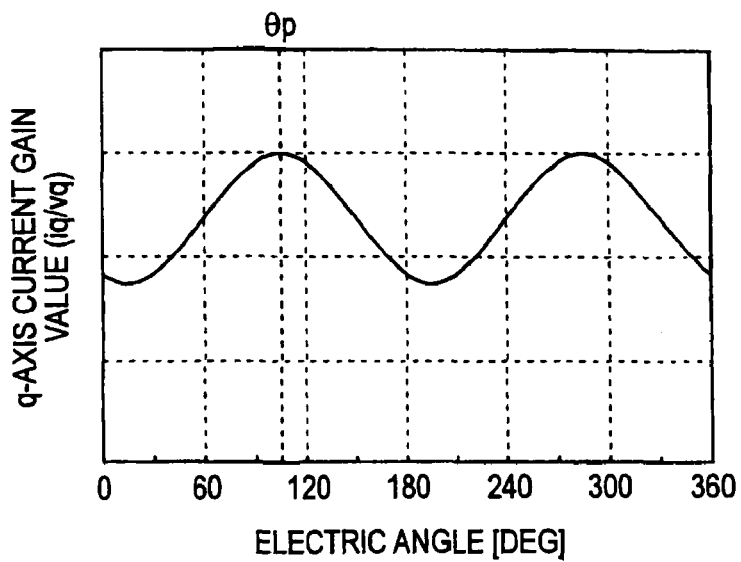
FIG. 5 is a view for explaining a correction method of the phase voltage instruction value in the above first embodiment.
Figure 5:
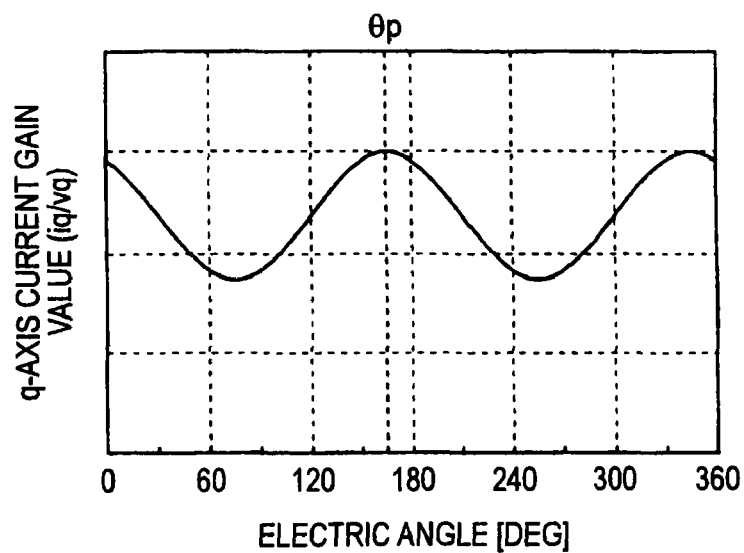
Figure 5:
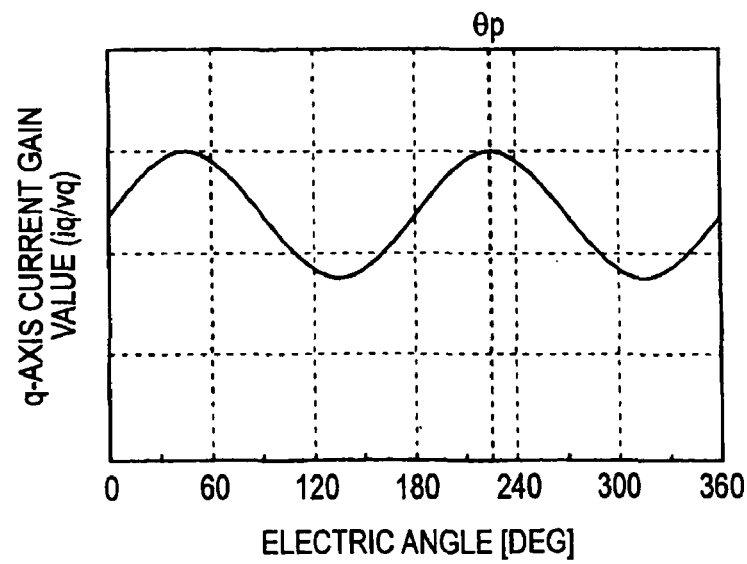

Additionally, the following matters are derived from the above Equation (6). That is, when the phase resistances $R_u$, $R_v$, and $R_w$ have the relationship of $R_v > R_w$ or $R_u$, the peak electric angle θp exists within a range of θ=90 to 150 degrees, for example, as shown in FIG. 5(*a*), and when the phase resistances have the relationship of $R_u > R_v$ or $R_w$, the peak electric angle θp exists within a range of θ=150 to 210 degrees, for example, as shown in FIG. 5(*b*), and when the phase resistances have the relationship of $R_w > R_u$ or $R_v$, the peak electric angle θp exists within a range of θ=210 to 270 degrees, for example, as shown in FIG. 5(*c*).

Thus, in the correction coefficient determining unit 42 in this embodiment, the correction coefficients $g_u$, $g_v$, and $g_w$ are determined as follows. In addition, in the following, when the determination of the correction coefficients $g_u$, $g_v$, and $g_w$ based on the angle-dependent data is not made at all, an initial value which is suitable as these correction coefficients $g_u$, $g_v$, and $g_w$, for example, "1" (a value which corresponds to no correction) is set.

(A1) In the case of 90 [deg]≦θp<150 [deg]

The value obtained by increasing a v-phase correction coefficient $g_v$ at this time is newly set to a v-phase correction coefficient $g_v$. This means that an applied voltage to the v-phase resistance $R_v$ is made greater than that before correction in order to reduce the amplitude difference between the v-phase current and the u-phase and w-phase currents.

(A2) In the case of 150 [deg]≦θp<210 [deg]

The value obtained by increasing a u-phase correction coefficient $g_u$ at this time is newly set to a u-phase correction coefficient $g_u$. This means that an applied voltage to the u-phase resistance $R_u$ is made greater than that before correction in order to reduce the amplitude difference between the u-phase current and the v-phase and w-phase currents.

(A3) In the case of 210 [deg]≦θp<270 [deg]

The value obtained by increasing a w-phase correction coefficient $g_w$ at this time is newly set to a w-phase correction coefficient $g_w$. This means that an applied voltage to the w-phase resistance $R_w$ is made greater than that before correction in order to reduce the amplitude difference between the w-phase current and the u-phase and v-phase currents.

According to the corrections like the above (A1) to (A3), the amplitude difference between u-phase, v-phase, and w-phase currents is reduced or eliminated. Thus, the dependency of the q-axis current $i_q$ on the electric angle θ is eliminated, and as a result, the torque ripple in the brushless motor 1 is suppressed. Hereinafter, specific examples of such corrections will be further described.

For example, in a case where the peak electric angle θp obtained based on the above angle-dependent data is 150 [deg] as shown in FIG. 6(*a*), the phase resistances $R_u$, $R_v$, and $R_w$ have the relationship of $R_u = R_v > R_w$. In this case, in the correction coefficient determining unit 42, the u-phase and v-phase correction coefficients $g_u$ and $g_v$ at this time are changed to, for example, the values of 1.1 multiples thereof. Additionally, in a case where the peak electric angle θp obtained based on the above angle-dependent data is 165 [deg] as shown in FIG. 6(*b*), the phase resistances $R_u$, $R_v$, and $R_w$ have the relationship of $R_u > R_v > R_w$. In this case, in the correction coefficient determining unit 42, the u-phase correction coefficient $g_u$ at this time is changed to, for example, the value of 1.1 multiples thereof, and the v-phase correction coefficient $g_v$ at this time is changed to, for example, the value of 1.05 multiples thereof. Moreover, in a case where the peak electric angle θp obtained based on the above angle-dependent data is 180 [deg] as shown in FIG. 6(*c*), the phase resistances $R_u$, $R_v$, and $R_w$ have the relationship of $R_u > R_v = R_w$. In this case, in the correction coefficient determining unit 42, the u-phase correction coefficient $g_u$ at this time is changed to, for example, the value of 1.1 multiples thereof. Furthermore, in a case where the peak electric angle θp obtained based on the above angle-dependent data is 195 [deg] as shown in FIG. 6(*d*), the phase resistances $R_u$, $R_v$, and $R_w$ have the relationship of $R_u > R_w > R_v$. Therefore, in the correction coefficient determining unit 42, the u-phase correction coefficient $g_u$ at this time is changed to, for example, the value of 1.1 multiples thereof, and the w-phase correction coefficient $g_w$ at this time is changed to, for example, the value of 1.05 multiples thereof.

In the above description, the multiplying factor when the correction coefficients $g_u$, $g_v$, and $g_w$ at this time is changed, or the value after the change is determined according to the fluctuation range (amplitude) of the secondary harmonic component regarding the electric angle θ included in the q-axis current gain value $i_q/v_q$. In addition, numeric values including "1.1 multiples" or "1.05 multiples" shown above are merely examples. Practically, it is preferable to adjust the method of determining the correction coefficients $g_u$, $g_v$, and $g_w$ by the correction coefficient determining unit 42 so that appropriate correction coefficients $g_u$, $g_v$, and $g_w$ are determined using experimental data or computer simulation results that the dependency of the q-axis current on the electric angle θ is suppressed.

In the correction executing unit 43, the phase voltage instruction values $V_u$, $V_v$, and $V_w$ are corrected according to the above Equations (7) to (9), using the correction coefficient $g_u$, $g_v$, and $g_w$ determined as described above. Such phase voltage instruction values $V_{uc}$, $V_{vc}$, and $V_{wc}$ after correction are used for driving of the brushless motor 1 as mentioned earlier.

As described above, related to this embodiment, the phase voltage instruction values are corrected so that the dependency of the q-axis current on the electric angle θ that the secondary harmonic component concerning the electric angle θ of the q-axis current shows is reduced or eliminated. Thus, the interphase resistance difference is compensated to suppress generation of a torque ripple resulting from the interphase resistance difference. Accordingly, a favorable steering feel can be provided to a driver by using the motor control device related to this embodiment in order to drive the brushless motor 1 which generates the steering assist power in the electric power steering device as shown in FIG. 1.

3. Modification of First Embodiment

Next, a modification of the above embodiment will be described. In addition, among constituent elements of the modification as will be described below, the same constituent elements as those of the above embodiment, or constituent elements corresponding thereto will be shown by the same reference numerals, and the detailed descriptions thereof are omitted.

In the above embodiment, the data showing the q-axis current gain value $i_q/v_q$ to various electric angles θ of 0 to 360 degrees is acquired as the angle-dependent data by the data acquisition unit 41, and the correction coefficients $g_u$, $g_v$, and $g_w$ are determined by the correction coefficient determining unit 42 based on this angle-dependent data. Instead of this, however, the data showing the d-axis current gain value $i_d/v_d$ to various electric angles θ of 0 to 360 degrees (relative voltage) may be acquired as the angle-dependent data by the data acquisition unit 41, and the correction coefficients $g_u$, $g_v$, and $g_w$ may be determined through the correction coefficient determining unit 42 based on this angle-dependent data. According to this configuration, through the correction of the phase voltage instruction values $V_u$, $V_v$, and $V_w$ using the correction coefficients $g_u$, $g_v$, and $g_w$, the dependency of the d-axis current $i_d$ on the electric angle θ is reduced or eliminated, and the amplitude difference between the u-phase, v-phase, and w-phase currents is reduced or eliminated. Thus, the torque ripple in the brushless motor 1 can be suppressed similarly to the above embodiment.

Figure 7:
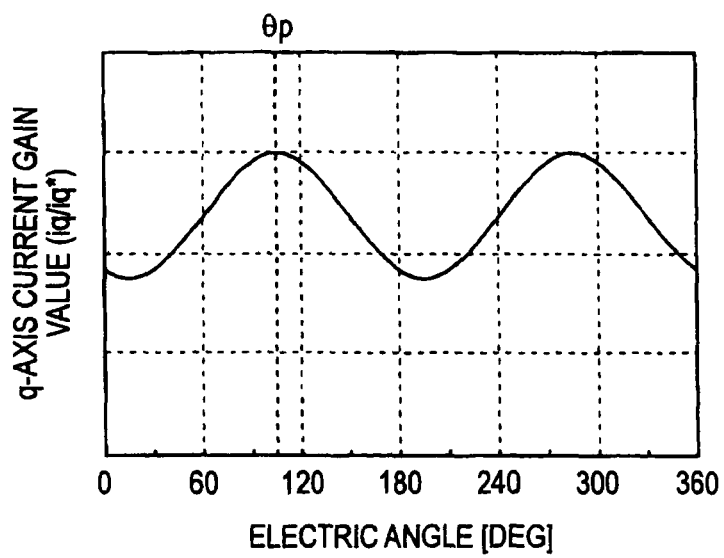
FIG. 7 is a view for explaining a correction method of a phase voltage instruction value in a modification of the above first embodiment.
Figure 7:
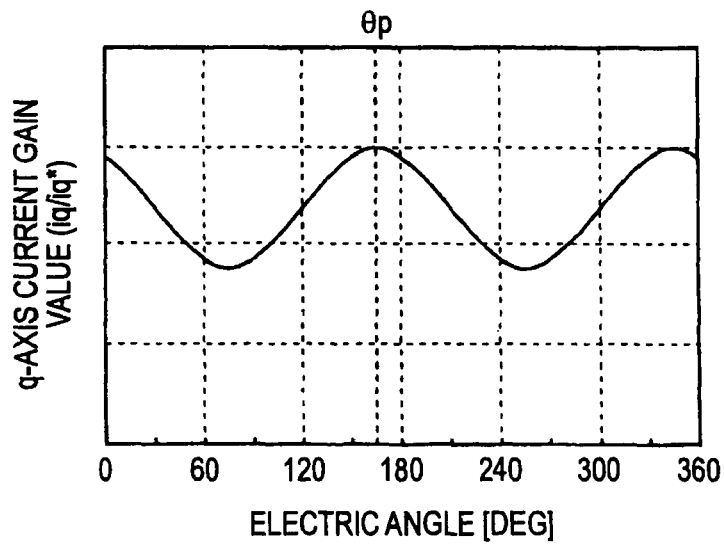
Figure 7:
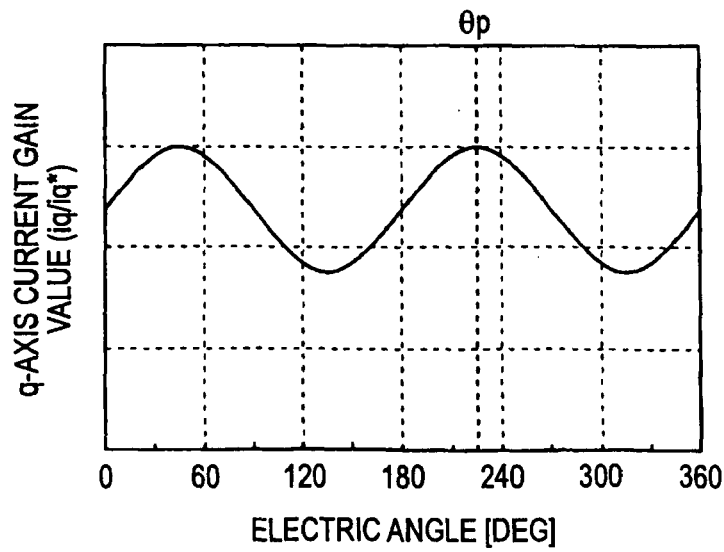

Additionally, in the above embodiment, not the data showing the q-axis current detection value $i_q$ itself but the data showing the q-axis current gain value $i_q/v_q$ is acquired as the angle-dependent data. Instead of this, however, the data showing the ratio (hereinafter referred to as a "relative instruction q-axis current gain value" or a "q-axis current gain value") $i_q/i_q^*$ of the q-axis current detection value $i_q$ to the q-axis current instruction value $i_q^*$ may be acquired as the angle-dependent data when $i_q^* \neq 0$. The q-axis current instruction value $i_q^*$ required for acquisition of this angle-dependent data is obtained from the instruction current calculating unit 21. Even by such a modification, it is possible to remove the influence on the q-axis current caused by a change in an electric current to be supplied to the brushless motor 1, i.e., a change in a current instruction value (or a change in an applied voltage to the brushless motor 1 corresponding thereto), thereby appropriately acquiring the data showing the dependency of the q-axis current on the electric angle θ. Hereinafter, this modification will be described with reference to FIG. 7.

When the electric angle at which the above q-axis current gain value $i_q/i_q^*$ becomes the greatest is referred to as a "peak electric angle", the following matters are derived from Equation (6) as mentioned earlier similarly to the above first embodiment. That is, when the phase resistances $R_u$, $R_v$, and $R_w$ have the relationship of $R_v > R_w$ or $R_u$, the peak electric angle θp exists within a range of θ=90 to 150 degrees as shown in FIG. 7(a), and when the phase resistances have the relationship of $R_u > R_v$ or $R_w$, the peak electric angle θp exists within a range of θ=150 to 210 degrees as shown in FIG. 7(b), and when the phase resistances have the relationship of $R_w > R_u$ or $R_v$, the peak electric angle θp exists within a range of θ=210 to 270 degrees as shown in FIG. 7(c).

Thus, even in this modification, in the correction coefficient determining unit 42, the correction coefficients $g_u$, $g_v$, and $g_w$ are determined similarly to the above first embodiment. That is, in the case of 90 [deg]≦θp<150 [deg], the value obtained by increasing the v-phase correction coefficient $g_v$ at this time is newly set to a v-phase correction coefficient $g_v$. Additionally, in the case of 150 [deg]≦θp<210 [deg], the value obtained by increasing the u-phase correction coefficient $g_u$ at this time is newly set to a u-phase correction coefficient $g_u$. Moreover, in the case of 210 [deg]≦θp<270 [deg], the value obtained by increasing the w-phase correction coefficient $g_w$ at this time is newly set to a w-phase correction coefficient $g_w$. The correction executing unit 43 of this modification also corrects the phase voltage instruction values $V_u$, $V_v$, and Vw according to Equations (7) to (9) as mentioned earlier, using such new correction coefficients $g_u$, $g_v$, and $g_w$.

In addition, the multiplying factor when the correction coefficients $g_u$, $g_v$, and $g_w$ at this time are changed, or the value after the change is determined according to the fluctuation range (amplitude) of the secondary harmonic component regarding the electric angle θ included in the q-axis current gain value $i_q/i_q^*$. Practically, it is preferable to adjust the method of determining the correction coefficients $g_u$, $g_v$, and $g_w$ by the correction coefficient determining unit 42 so that appropriate correction coefficients $g_u$, $g_v$, and $g_w$ are determined using experimental data or computer simulation results such that the dependency of the q-axis current on the electric angle θ is suppressed. Other configurations in this modification are the same as those of the above embodiment.

Even by the above modification, the amplitude difference between u-phase, v-phase, and w-phase currents is reduced or eliminated. Thus, the dependency of the q-axis current $i_q$ on the electric angle θ is eliminated, and as a result, the torque ripple in the brushless motor 1 is suppressed.

In addition, in the above embodiment or the modification thereof, the timing with which the data acquisition unit 41 acquires the current gain value $i_q/v_q$, $i_d/v_d$ or $i_q/i_q^*$ which constitutes the above angle-dependent data in the above embodiment or modification, the timing with which the correction coefficient determining unit 42 determines new correction coefficients $g_u$, $g_v$, and $g_w$ based on the above angle-dependent data, and outputs the new correction coefficients to the correction executing unit 43 is not particularly limited. Such acquisition timings of the current gain values or such output timing of the correction coefficients may be set, for example at predetermined intervals, or when the state of the temperature or the like has changed, the above angle-dependent data may be acquired so as to output the new correction coefficients $g_u$, $g_v$, and $g_w$.

In addition, in a case where the current gain value $i_q/v_q$ which constitutes the above angle-dependent data is acquired, the timing of the data acquisition is not particularly limited if the timing is $v_q \neq 0$. However, in a case where the q-axis voltage instruction value $v_q$ is close to zero, an error is apt to occur, and the detection precision of the peak electric angle $\theta p$ is reduced. Thus, the current gain value $i_q/v_q$ may be acquired so long as the q-axis voltage instruction value $v_q$ is equal to or more than a predetermined lower limit. For the same reason, in a case where the current gain value $i_q/v_q^*$ which constitutes the above angle-dependent data is acquired, and in a case where the q-axis current instruction value $i_q^*$ is close to zero, an error is apt to occur, and the detection precision of the peak electric angle $\theta p$ is reduced. Thus, the current gain value $i_q/v_q^*$ may be acquired so long as the q-axis current instruction value $i_q^*$ is equal to or more than a predetermined lower limit (threshold value). Additionally, when the angular velocity $\omega_e$ of the rotor is large, the counter-electromotive force becomes large, and an applied voltage to respective phase resistances $R_u$, $R_v$, and $R_w$ becomes small. Thus, for this same reason, when the above angle-dependent data is acquired, an error is apt to occur, and the detection precision of the peak electric angle $\theta p$ is reduced. Accordingly, the above angle-dependent data may be acquired so long as the angular velocity $\omega_e$ is equal to or less than a predetermined upper limit (threshold value). Additionally, since the counter-electromotive force becomes large when the angular velocity $\omega_e$ is large, the torque ripple becomes small even if there is an interphase resistance difference. Accordingly, the phase voltage instruction values $V_u$, $V_v$, and $V_w$ may be corrected in the correction executing unit 43 so long as the angular velocity $\omega_e$ is equal to or less than a predetermined upper limit (refer to Equations (7) to (9)).

Meanwhile, when an electric current (motor current) which flows into the brushless motor 1 becomes large, the resistance becomes large due to generation of heat, whereas the interphase resistance difference is not generally changed by the currents. Accordingly, when the motor current becomes large, the interphase resistance difference becomes relatively small compared to a resistance value, and as a result, the interphase current difference also becomes small. For this reason, since the amplitude of the secondary harmonic component (regarding the electric angle $\theta$) included in the current gain value $i_q/v_q$ or $i_q/i_q^*$ also becomes small, the detection precision of the peak electric angle $\theta p$ obtained from the above angle-dependent data is reduced. Accordingly, it is preferable to determine a threshold value as an upper limit in advance from the viewpoint of generation of heat as to the motor current (for example, the q-axis current detection value $i_q$), and to calculate the current gain value $i_q/v_q$ or $i_q/i_q^*$ to acquire the angle-dependent data, so long as the detection value or instruction value of the motor current is smaller than the threshold value.

Additionally, in the above embodiment or the modification thereof, in order to determine the correction coefficients $g_u$, $g_v$, and $g_w$ the angle-dependent data regarding either the q-axis current gain value or the d-axis current gain value is used. However, the angle-dependent data regarding both of the q-axis current gain value and the d-axis current gain value may be acquired so as to determine the correction coefficients $g_u$, $g_v$, and $g_w$ based on the angle-dependent data.

In addition, in the above embodiment or the modification thereof, R, $\Phi$, or the like which are used to calculate the d-axis voltage instruction value $v_d$ and the q-axis voltage instruction value $v_q$ in the open-loop control unit 22 are treated as known parameters. However, the value calculated by the $\Phi$ calculating unit 26 is used as $\Phi$. That is, $\Phi$ is appropriately corrected by the $\Phi$ calculating unit 26 although being treated as a known parameter. However, the invention is not limited to this. An R calculating unit may be provided instead of the $\Phi$ calculating unit 26 or along with the $\Phi$ calculating unit 26, and when the d-axis voltage instruction value $v_d$ and the q-axis voltage instruction value $v_q$ are obtained, R calculated by the R calculating unit may be used (this point is also the same in the embodiments which will be described later). In addition, in a case where the R calculating unit is provided, the R calculating unit obtains the armature winding resistance R included in the above Equations (1) and (2), using the following equation based on the q-axis voltage instruction value $v_q$, the d-axis current detection value $i_d$, the q-axis current detection value $i_q$, and the angular velocity $\omega_e$ when $i_q \neq 0$.

$$R = (v_q - PL_q i_q - \omega_e L_d i_d - \omega_e \Phi)/i_q$$

4. Second Embodiment

Figure 8:
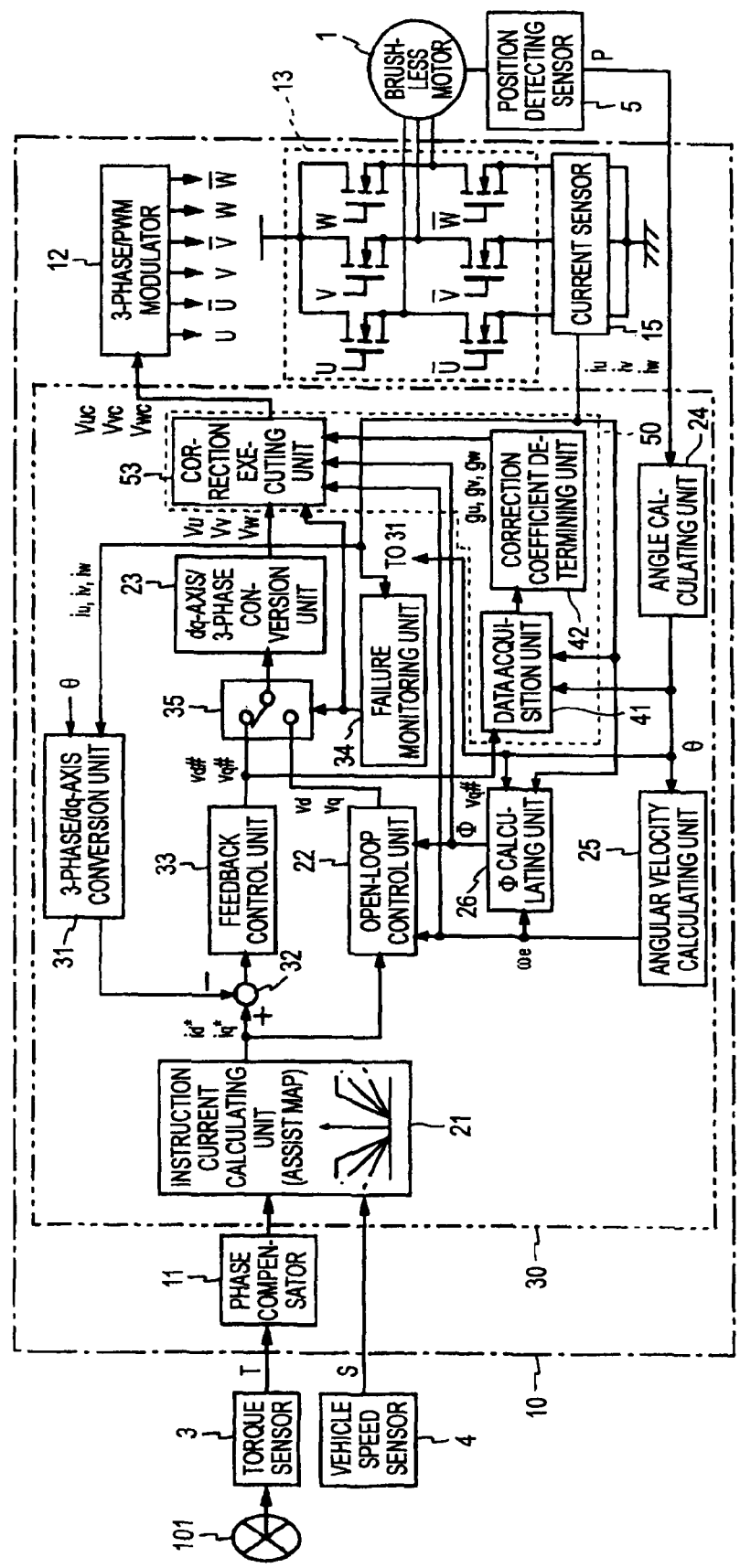
FIG. 8 is a block diagram showing the configuration of a motor control device related to a second embodiment of the invention.

FIG. 8 is a block diagram showing the configuration of a motor control device related to a second embodiment of the invention. The motor control device related to this embodiment is obtained by replacing the microcomputer 20 and the current sensor 14 in the motor control device related to the first embodiment with a microcomputer 30 and a current sensor 15. This motor control device performs a feedback control when the current sensor 15 is normally operating, and performs an open loop control when the current sensor 15 has failed.

The current sensors 15 are respectively provided on paths along which 3-phase driving currents supplied to the brushless motor 1 flow, and detects the 3-phase driving currents individually. 3-phase current values (hereinafter referred to as a u-phase current detection value $i_u$, a v-phase current detection value $i_v$, and a w-phase current detection value $i_w$) detected by the current sensors 15 are input to the microcomputer 30.

The microcomputer 30 is obtained by adding a 3-phase/dq-axis converter 31, a subtraction unit 32, a feedback control unit 33, a failure monitoring unit 34, and an instruction voltage selecting unit 35 to the microcomputer 20. Additionally, even in the microcomputer 30, similarly to the above first embodiment, a correction unit 50 including the data acquisition unit 41, the correction coefficient determining unit 42, and a correction executing unit 53 is realized. However, the functions of the correction executing unit 53 are slightly different from those of the above first embodiment (the details thereof will be described below).

The 3-phase/dq-axis converter 31 calculates the d-axis current detection value $i_d$ and the q-axis current detection value $i_q$, using the following Equations (16) and (17), based on the u-phase current detection value $i_u$ and the v-phase current detection value $i_v$ which have been detected by the current sensors 15.

$$i_d = \sqrt{2} \times \{i_v \times \sin\theta - i_u \times \sin(\theta - 2\pi/3)\} \tag{16}$$

$$i_q = \sqrt{2} \times \{i_v \times \cos\theta - i_u \times \cos(\theta - 2\pi/3)\} \tag{17}$$

The subtraction unit 32 obtains a deviation $E_d$ between the d-axis current instruction value $i_d^*$ and the d-axis current detection value $i_d$, and a deviation $E_q$ between the q-axis current instruction value $i_q^*$ and the q-axis current detection value $i_q$. The feedback control unit 33 performs the proportional integral operation shown in the following Equations (18) to (19) on the deviations $E_d$ and $E_q$, and obtains a d-axis voltage instruction value $v_d{}^t$ and a q-axis voltage instruction value $V_q{}^t$.

$$v_d{}^t = K \times \{E_d + (1/T) \int E_d \cdot dt\} \quad (18)$$

$$v_q{}^t = K \times \{E_q + (1/T) \int E_q \cdot dt\} \quad (19)$$

Here, K is a proportional gain constant, and T is integral time in Equations (18) and (19).

The failure monitoring unit 34 examines whether or not the 3-phase current values detected by the current sensors 15 are within a normal range, and determines whether the current sensors 15 are normally operating or fail. The failure monitoring unit 34 determines the current sensors to be "Normal", when all the 3-phase current values are within a normal range, and determines a current sensor to be "Failure" when current values of one or more phases are out of a normal range. The failure monitoring unit 34 outputs a control signal showing determination result.

When the current sensors are determined to be normal in the failure monitoring unit 34, the instruction voltage selecting unit 35 outputs the d-axis voltage instruction value $v_d{}^t$ and q-axis voltage instruction value $v_q{}^t$ which have been obtained in the feedback control unit 33, and when a current sensor is determined to fail in the failure monitoring unit 34, the instruction voltage selecting unit outputs the d-axis voltage instruction value $v_d$ and q-axis voltage instruction value $v_q$ which have been calculated by the open-loop control unit 22.

When the current sensors 15 are normally operating, the failure monitoring unit 34 determines that the current sensors are normal, and the instruction voltage selecting unit 35 selects the output of the feedback control unit 33. At this time, the instruction current calculating unit 21, the dq-axis/3-phase conversion unit 23, the angle calculating unit 24, the 3-phase/dq-axis converter 31, the subtraction unit 32, and the feedback control unit 33 operate, and the feedback control is performed. In addition to this, while the current sensors 15 are normally operating, the angular velocity calculating unit 25 and the Φ calculating unit 26 also operate. The Φ calculating unit 26 obtains the armature winding interlinking magnetic flux number Φ included in Equation (2), using Equation (15), while the current sensors 15 are normally operating.

The data acquisition unit 41 and the correction coefficient determining unit 42 also operate while the current sensors 15 are normally operating, similarly to the above first embodiment. That is, the data acquisition unit 41 acquires the angle-dependent data showing the q-axis current gain value $i_q/v_q{}^t$ to various electric angles θ, using the q-axis current detection value $i_q$ calculated based on the u-phase current detection value $i_u$ and the v-phase current detection value from the current sensors 15, the q-axis voltage instruction value $v_q{}^t$ from the feedback control unit 33, and the electric angle θ from the angle calculating unit 24. Additionally, the correction coefficient determining unit 42 determines the correction coefficients $g_u$, $g_v$, and $g_w$ based on the angle-dependent data. The correction coefficients $g_u$, $g_v$, and $g_w$ are given to the correction executing unit 53. Similarly to the above first embodiment, along with the correction coefficients $g_u$, $g_v$, and $g_w$, the armature winding interlinking magnetic flux number Φ is given to the correction executing unit 53 from the Φ calculating unit 26, and the angular velocity $\omega_e$ is given to the correction executing unit from the angular velocity calculating unit 25. Moreover, a control signal showing a determination result in the failure monitoring unit 34 is also given to the correction executing unit 53.

Meanwhile, while the current sensors 15 are normally operating, the feedback control is performed so that the deviation $E_d$ between the d-axis current instruction value $i_d{}^*$ and the d-axis current detection value $i_d$ and the deviation $E_q$ between the q-axis current instruction value $i_q{}^*$ and the q-axis current detection value $i_q$ are cancelled. Therefore, generally, the generation of the torque ripple resulting from the inter-phase resistance difference does not become a problem. Thus, in this embodiment, the correction executing unit 53 gives the phase voltage instruction values $V_u$, $V_v$, and $V_w$, which are output from the dq-axis/3-phase conversion unit 23, to the 3-phase/PWM modulator 12 as they are, without correcting the phase voltage instruction values while the current sensors 15 are normally operating, i.e., while the feedback control is performed, based on the above control signal from the failure monitoring unit 34. That is, $V_u = V_{uc}$, $V_v = V_{vc}$, and $V_w = V_{wc}$ are established. However, even while the feedback control is performed, the phase voltage instruction values $V_u$, $V_v$, and $V_w$ may be corrected using the above correction coefficients $g_u$, $g_v$, and $g_w$.

Thereafter, when the current sensors 15 fail, the failure monitoring unit 34 determines that a current sensor have failed, and the instruction voltage selecting unit 35 selects the output of the open-loop control unit 22. At this time, the instruction current calculating unit 21, the open-loop control unit 22, the dq-axis/3-phase conversion unit 23, and the angle calculating unit 24 operate, and the open loop control is performed. The open-loop control unit 22 obtains the d-axis voltage instruction value $v_d$ and the q-axis voltage instruction value $v_q$, using the Φ value obtained while the current sensors 15 are normally operating. The d-axis voltage instruction value $v_d$ and the q-axis voltage instruction value $v_q$ are given to the dq-axis/3-phase conversion unit 23 via the instruction voltage selecting unit 35, and are converted into the phase voltage instruction values $V_u$, $V_v$, and $V_w$ in the instruction voltage selecting unit. The phase voltage instruction values $V_u$, $V_v$, and $V_w$ are given to the correction executing unit 53.

The correction executing unit 53 corrects the phase voltage instruction values $V_u$, $V_v$, and $V_w$ according to Equations (7) to (12) as mentioned earlier, using the correction coefficients $g_u$, $g_v$, and $g_w$ from the correction coefficient determining unit 42, the armature winding interlinking magnetic flux number Φ from the Φ calculating unit 26, and the angular velocity $\omega_e$ from the angular velocity calculating unit 25, similarly to the above first embodiment, when a current sensor 15 fails, based on the control signal from the failure monitoring unit 34. The phase voltage instruction values $V_{uc}$, $V_{vc}$, and $V_{wc}$ after this correction are given to the 3-phase/PWM modulator 12. A motor driving means including the 3-phase/PWM modulator 12 and the motor drive circuit 13 drives the brushless motor 1 by the voltages of the phase voltage instruction values $V_{uc}$, $V_{vc}$, and $V_{wc}$.

As shown above, the motor control device related to this embodiment obtains the voltage instruction values by performing proportional integral operation on the differences between the current instruction values and the current values detected by the current sensors when the current sensors are normally operating, and obtains the voltage instruction values by performing the open loop control according to the circuit equations of the motor, based on the current instruction values and the angular velocity of the rotor, when a current sensor has failed. Additionally, when the open loop control is performed, the Φ value (the armature winding interlinking magnetic flux number Φ) obtained while the current sensors are normally operating is used. Accordingly, according to the motor control device related to this embodiment, while the current sensors are normally operating, the feedback control can be performed to drive the brushless motor with high precision. Additionally, when a current sensor fails, and the feedback control cannot be performed, the brushless motor can be driven with high precision to obtain a desired motor output, by performing the open loop control, using the armature winding interlinking magnetic flux number Φ obtained while the feedback control is performed.

Additionally, according to this embodiment, in a case where the open loop control is performed, the phase voltage instruction values are corrected by the correction executing unit 53 so that the dependency of the q-axis current $i_q$ or d-axis current $i_d$ on the electric angle θ is reduced or eliminated using the correction coefficients obtained by the data acquisition unit 41 and the correction coefficient determining unit 42. This suppresses generation of the torque ripple resulting from the interphase resistance difference. Accordingly, even in a case where a current sensor fails, and the feedback control cannot be performed, a favorable steering feel can be obtained.

In addition, even in this embodiment, the same modifications as the modification of the above first embodiment can be made to the data acquisition unit 41 and the correction coefficient determining unit 42.

5. Other Embodiments

Although only one current sensor 14 is provided in the above first embodiment or modification, a plurality of (two or three) may be provided. For example, in a case where current sensors for u-phase and v-phase are provided, the d-axis current detection value $i_d$ and q-axis current detection value $i_q$ which are used in the data acquisition unit 41 and the Φ calculating unit 26 are obtained by converting the u-phase current detection value $i_u$ and v-phase current detection value $i_v$ which are output from the current sensors for u-phase and v-phase into the current values on the dq coordinate axes.

Additionally, in the motor control device related to the second embodiment, the feedback control and the open loop control are switched to each other by the determination result in the failure monitoring unit 34. However, the feedback control and the open loop control may be switched to each other by determination (for example, by driver's selection) other than determination in the failure monitoring unit 34.

In addition, the invention can be applied not only to the above-descried column assist type electric power steering device but also a pinion assist type or rack assist type electric power steering device. Additionally, the invention can also be applied to motor control devices other than the electric power steering device.

6. Third Embodiment

Figure 9:
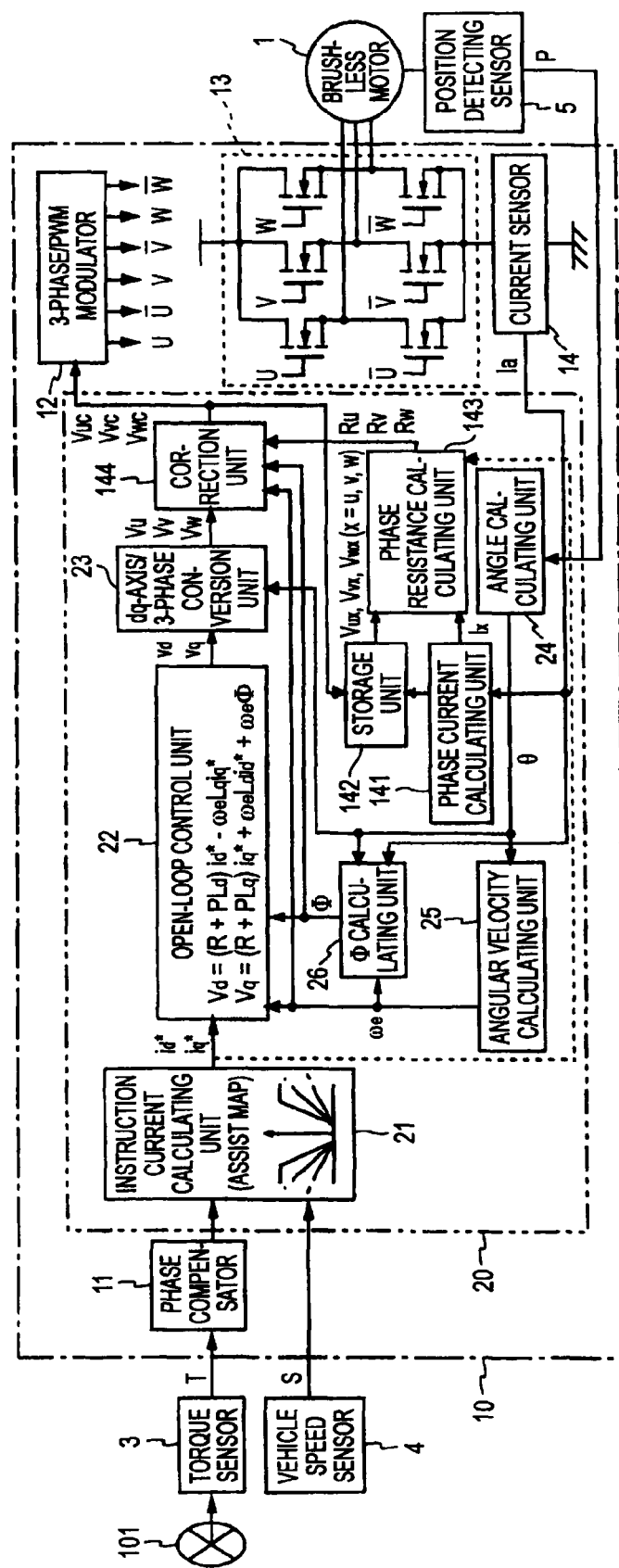
FIG. 9 is a block diagram showing the configuration of a motor control device related to a third embodiment of the invention.
Figure 10:
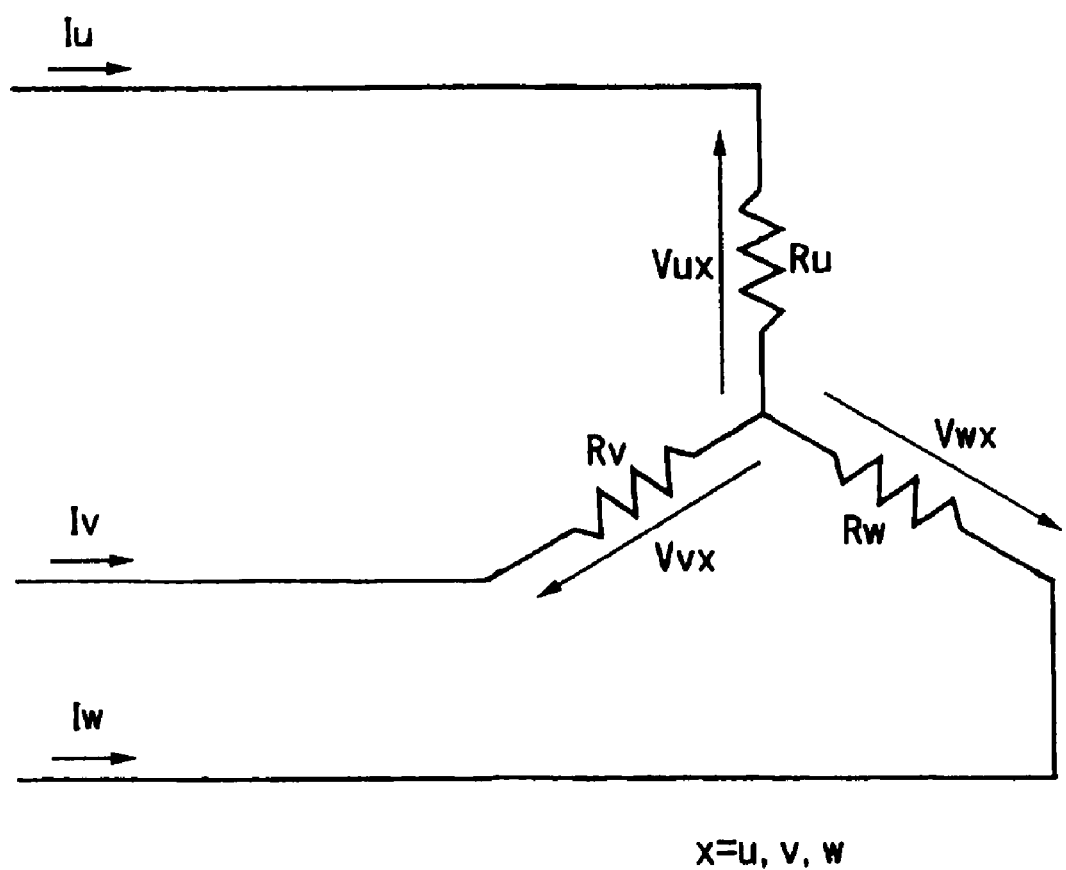
FIG. 10 is a view for explaining a calculation method of phase resistance in the above third embodiment.

Next, a motor control device related to a third embodiment of the invention will be described referring to FIGS. 9 to 11.

In addition, the third embodiment is mainly different from the first embodiment in that the microcomputer functions as a phase current calculating unit 141, a storage unit 142, a phase resistance calculating unit 143, and a correction unit 144, instead of the data acquisition unit 41, the correction coefficient determining unit 42, and the correction executing unit 43 in the first embodiment. In the following description, the same reference numerals will be given to the same components as the first embodiment, and the descriptions thereof are omitted.

In this embodiment a current detecting means which detects the u-phase, v-phase, and w-phase currents $I_u$, $I_v$, and $I_w$ of the brushless motor 1 is constituted by the current sensor 14, and the phase current calculating unit 41 which will be described later.

According to the third embodiment, while the brushless motor 1 is rotating, 3-phase driving currents can be detected using one current sensor 14. Thus, in this embodiment, the phase current calculating unit 141 calculates the values (hereinafter, referred to as a "u-phase current detection value $I_u$," a "v-phase current detection value $I_v$," and a w-phase current detection value $I_w$ and generically referred to respective current detection values $I_u$, $I_v$, and $I_w$) of the u-phase, v-phase, and w-phase currents which flow into the brushless motor 1 from the current value $I_a$ detected by the current sensor 14. Additionally, the storage unit 142 stores the phase voltage instruction value $V_{uc}$, $V_{vc}$, and $V_{wc}$ after correction at the time of the detection of respective phase current detection value $I_x$ (x=u, v, and w), i.e., at the time of the detection of the current value $I_a$ used for the calculation of the respective phase current detection value $I_x$. In the following, the phase voltage instruction values $V_{uc}$, $V_{vc}$, and $V_{wc}$ after correction at the time of the detection of the x-phase current detection value $I_x$ are shown by symbols "$V_{ux}$", "$V_{vx}$", and "$V_{wx}$", respectively (x=u, v, and w).

The phase resistance calculating unit 143 obtains the values of the u-phase resistance $R_u$, the v-phase resistance $R_v$, and the w-phase resistance $R_w$ (refer to FIG. 10), based on the respective phase current detection value $I_x$ detected by a current detecting means including the above phase current calculating unit 141 and current sensor 14, and the phase voltage instruction value $V_{ux}$, $V_{vx}$, and $V_{wx}$ (x=u, v, and w) after correction at the time of the detection of the respective phase current detection values. Here, the u-phase resistance, the v-phase resistance, and the w-phase resistance mean circuit resistances including armature winding resistances regarding u-phase, v-phase, and w-phase, respectively, and are shown by symbols "$R_u$", "$R_v$", and "$R_w$", respectively. Additionally, the symbols "$R_u$", "$R_v$", and "$R_w$" shall also show the values of the u-phase resistance, the v-phase resistance, and the w-phase resistance, respectively. In addition, in the following, the u-phase resistance, the v-phase resistance, and the w-phase resistance are also collectively referred to as a "phase resistances". The wiring resistance between the brushless motor 1 and the ECU 10, the resistances and wiring resistances within of the motor drive circuit 13 within the ECU 10, or the like are included in circuit resistances equivalent to these phase resistances. This point is also the same in the other embodiments. The details of a calculation method of the phase resistances $R_u$, $R_v$, and $R_w$ in the phase resistance calculating unit 143 will be described later.

The values of the phase resistances $R_u$, $R_v$, and $R_w$ calculated by the phase resistance calculating unit 143, the armature winding interlinking magnetic flux number Φ calculated by the Φ calculating unit 26, and the angular velocity $\omega_e$ calculated by the angular velocity calculating unit 25 are input to the correction unit 144, and the correction unit 144 corrects the phase voltage instruction values $V_u$, $V_v$, and $V_w$ according to the following Equations (20) to (22).

$$V_{uc} = (V_u - e_u) \cdot R_u / R_r + e_u \quad (20)$$

$$V_{vc} = (V_v - e_v) \cdot R_v / R_r + e_v \quad (21)$$

$$V_{wc} = (V_w - e_w) \cdot R_w / R_r + e_w \quad (22)$$

In the above Equations (20) to (22), $R_r$ is a resistance value (hereinafter referred to as a "reference resistance value") to be a reference set common to the respective phases. As this reference resistance value $R_r$, for example, an average value of the respective phase resistances can be used, and the resistance value of a specific phase at a predetermined point of time may be used. Moreover, the reference resistance value $R_r$ may not necessarily be a fixed value. In addition, when the values of the phase resistances $R_u$, $R_v$, and $R_w$ are not yet calculated, the value of the reference resistance value $R_r$ may be determined in advance, and the phase voltage instruction values $V_{uc}$, $V_{vc}$, and $V_{wc}$ after correction may be calculated as $R_u=R_v=R_w=R_r$.

In the above Equations (20) to (22), $e_u$, $e_v$, and $e_w$ are calculated from Equations (11) to (13) similarly to the first embodiment. Additionally, since the armature winding interlinking magnetic flux number Φ by the Φ calculating unit 26 can be calculated similarly to the first embodiment, the voltage instruction values can be obtained using the Φ value.

Through the above configuration, according to the second embodiment, the same effects as the first embodiment can be obtained.

In addition, in the second embodiment, R, Φ, or the like which are used to calculate the d-axis voltage instruction value $v_d$ and the q-axis voltage instruction value $v_q$ in the open-loop control unit 22 are treated as known parameters. However, the value calculated by the Φ calculating unit 26 is used as Φ. That is, Φ is appropriately corrected by the Φ calculating unit 26 serving as a parameter calculation means although being treated as a known parameter. However, the invention is not limited to this configuration. An R calculating unit serving as a parameter calculation means may be provided instead of the Φ calculating unit 26 or along with the Φ calculating unit 26, and when the d-axis voltage instruction value $v_d$ and the q-axis voltage instruction value $v_q$ are obtained, R calculated by the R calculating unit may be used (this point is also the same in other embodiments which will be described later). In addition, in a case where the R calculating unit is provided, the R calculating unit obtains the armature winding resistance R included in the above Equations (1) and (2), using the following equation based on the q-axis voltage instruction value $v_q$, the d-axis current detection value $i_d$, the q-axis current detection value $i_q$, and the angular velocity $\omega_e$ when $i_q \neq 0$.

$$R=(v_q - PL_q i_q - \omega_e L_d i_d - \omega_e \Phi)/i_q$$

Next, a calculation method of the phase resistances $R_u$, $R_v$, and $R_w$ in the phase resistance calculating unit 143 will be described. In this embodiment, when the temporal change of an x-phase current is loose, the x-phase current is detected, and a voltage drop caused by the x-phase inductance is negligible (x=u, v, and w). In this case, when the u-phase, v-phase, and w-phase counter-electromotive forces (induced voltages) in the brushless motor 1 at the time of the detection of the x-phase current detection value $I_x$ are shown by "$E_{ux}$", "$E_{vx}$", and "$E_{wx}$", respectively, and the u-phase, v-phase, and w-phase current values at the time of the detection of the x-phase current detection value $I_x$ are shown by "$I_{ux}$", "$I_{vx}$", and "$I_{wx}$", respectively (x=u, v, and w), the following equations are established.

$$V_{uu}=I_{uu} \cdot R_u + E_{uu} \tag{23a}$$

$$V_{vu}=I_{vu} \cdot R_v + E_{vu} \tag{23b}$$

$$V_{wu}=I_{wu} \cdot R_w + E_{wu} \tag{23c}$$

$$V_{uv}=I_{uv} \cdot R_u + E_{uv} \tag{24a}$$

$$V_{vv}=I_{vv} \cdot R_v + E_{vv} \tag{24b}$$

$$V_{wv}=I_{wv} \cdot R_w + E_{wv} \tag{24c}$$

$$V_{uw}=I_{uw} \cdot R_u + E_{uw} \tag{25a}$$

$$V_{vw}=I_{vw} \cdot R_v + E_{vw} \tag{25b}$$

$$V_{ww}=I_{ww} \cdot R_w + E_{ww} \tag{25c}$$

$$I_{uu}+I_{vu}+I_{wu}=0 \tag{26a}$$

$$I_{uv}+I_{vv}+I_{wv}=0 \tag{26b}$$

$$I_{uw}+I_{vw}+I_{ww}=0 \tag{26c}$$

$$E_{uu}+E_{vu}+E_{wu}=0 \tag{27a}$$

$$E_{uv}+E_{vv}+E_{wv}=0 \tag{27b}$$

$$E_{uw}+E_{vw}+E_{ww}=0 \tag{27c}$$

$$V_{uu}+V_{vu}+V_{wu}=0 \tag{28a}$$

$$V_{uv}+V_{vv}+V_{wv}=0 \tag{28b}$$

$$V_{uw}+V_{vw}+V_{ww}=0 \tag{28c}$$

In the above eighteen Equations (23a) to (28c), the phase voltage instruction values $V_{ux}$, $V_{vx}$, and $V_{wx}$ (x=u, v, and w) and the phase current detection values $I_{uu}$, $I_{vv}$, and $I_{ww}$ are known, and the phase resistances $R_u$, $R_v$, and $R_w$, the phase current values $I_{vu}$, $I_{wu}$, $I_{uv}$, $I_{uw}$, and $I_{vw}$ and the induced voltages $E_{ux}$, $E_{vx}$, and $E_{wx}$ (x=u, v, and w) are eighteen unknowns. Thus, the phase resistances $R_u$, $R_v$, and $R_w$ can be obtained from the above Equations (23a) to (28c). Specifically, the phase resistances $R_u$, $R_v$, and $R_w$ are obtained as follows.

When the u-phase current is detected, the phase current calculating unit 141 outputs the u-phase current detection value $I_u$, the storage unit 142 stores the u-phase, v-phase, and w-phase voltage instruction values $V_{uc}$, $V_{vc}$, and $V_{wc}$ after correction at the time of the detection as $V_{uu}$, $V_{vu}$, and $V_{wu}$, respectively. The phase resistance calculating unit 143 obtains $U_a$ and $U_b$ given by the following equations, using the u-phase current detection value $I_u$, and the phase voltage instruction values $V_{uu}$, $V_{vu}$ and $V_{wu}$ at the time of the detection when $I_u \neq 0$.

$$U_a=(V_{uu}-V_{vu})/I_u \tag{29a}$$

$$U_b=(V_{uu}-V_{wu})/I_u \tag{29b}$$

When the v-phase current is detected, the phase current calculating unit 141 outputs the v-phase current detection value $I_v$, the storage unit 142 stores the u-phase, v-phase, and w-phase voltage instruction values $V_{uc}$, $V_{vc}$, and $V_{wc}$ after correction at the time of the detection as $V_{uv}$, $V_{vv}$, and $V_{wv}$, respectively. The phase resistance calculating unit 143 obtains $V_a$ and $V_b$ given by the following equations, using the v-phase current detection value $I_v$, and the phase voltage instruction values $V_{uv}$, $V_{vv}$, and $V_{wv}$ at the time of the detection when $I_v \neq 0$.

$$V_a=(V_{vv}-V_{wv})/I_v \tag{30a}$$

$$V_b=(V_{vv}-V_{uv})/I_v \tag{30b}$$

When the w-phase current is detected, the phase current calculating unit 141 outputs the w-phase current detection value $I_w$, the storage unit 142 stores the u-phase, v-phase, and w-phase voltage instruction values $V_{uc}$, $V_{vc}$, and $V_{wc}$ after correction at the time of the detection as $V_{uw}$, $V_{vw}$, and $V_{ww}$, respectively. The phase resistance calculating unit 143 obtains $W_a$ and $W_b$ given by the following equations, using the w-phase current detection value $I_w$, and the phase voltage instruction values $V_{uw}$, $V_{vw}$, and $V_{ww}$ at the time of the detection when $I_w \neq 0$.

$$W_a=(V_{ww}-V_{uw})/I_w \tag{31a}$$

$$W_b=(V_{ww}-V_{vw})/I_w \tag{31b}$$

Next, $r_a$, $r_b$, $r_c$, and $r_d$ given by the following equations are calculated using the calculated $U_a$, $U_b$, $V_a$, $V_b$, $W_a$, and $W_b$.

$$r_a = U_a \cdot V_a \cdot W_a - U_b \cdot V_b \cdot W_b \tag{32a}$$

$$r_b = W_a \cdot U_a - W_a \cdot V_b + U_b \cdot V_b \tag{32b}$$

$$r_c = U_a \cdot V_a - U_a \cdot W_b + V_b \cdot W_b \tag{32c}$$

$$r_d = V_a \cdot W_a - V_a \cdot U_b + W_b \cdot U_b \tag{32d}$$

Next, the phase resistances $R_u$, $R_v$, and $R_w$ are calculated by the following equations, using the calculated $r_a$, $r_b$, $r_c$, and $r_d$.

$$R_u = r_a \cdot r_b / (r_b \cdot r_c + r_c \cdot r_d + r_d \cdot r_b) \tag{33a}$$

$$R_v = r_a \cdot r_c / (r_b \cdot r_c + r_c \cdot r_d + r_d \cdot r_b) \tag{33b}$$

$$R_w = r_a \cdot r_d / (r_b \cdot r_c + r_c \cdot r_d + r_d \cdot r_b) \tag{33c}$$

The values of the phase resistance $R_u$, $R_v$, and $R_w$ required for correction of the phase voltage instruction values $V_u$, $V_v$, and $V_w$ according to Equations (20) to (22) as mentioned earlier can be calculated described above when the u-phase, v-phase, and w-phase current detection values $I_u$, $I_v$, and $I_w$ are detected. However when an electric current which flows into the brushless motor 1, the calculation accuracy of the phase resistances $R_u$, $R_v$, and $R_w$ is degraded due to generation of heat. Hereinafter, this point will be described.

Now, the difference of the v-phase resistance $R_v$ from the u-phase resistance $R_u$ is set to 1 mΩ, and the difference of the w-phase resistance $R_w$ from the u-phase resistance $R_u$ is set to 2 mΩ. In this case, if $R_u$=10 mΩ, $R_v$=11 mΩ and $R_w$=12 mΩ are obtained. Accordingly, resistance ratios $R_v/R_u$ and $R_w/R_u$ are obtained as follows:

$$R_v/R_u = 11/10 = 1.1, \text{ and}$$

$$R_w/R_u = 12/10 = 1.2.$$

Thus, when the resistance differences are shown by relative values, the difference of the v-phase resistance $R_v$ from the u-phase resistance $R_u$ is 10%, and the difference of the w-phase resistance $R_w$ from the u-phase resistance $R_u$ is 20%.

Generally, the interphase resistance differences are not influenced by generation of heat caused by an electric current which flows into the motor. For this reason, supposing that the u-phase resistance $R_u$ becomes, for example, $R_u$=20 mΩ by generation of heat caused by an electric current, $R_v$=21 mΩ and $R_w$=22 mΩ are obtained. Since resistance ratios $R_v/R_u$ and $R_w/R_u$ at this time are $$R_v/R_u = 21/20 = 1.05, \text{ and}$$

$$R_w/R_u = 22/20 = 1.1,$$

when the resistance differences are shown by relative values, the difference of the v-phase resistance $R_v$ from the u-phase resistance $R_u$ becomes 5%, and the difference of the w-phase resistance $R_w$ from the u-phase resistance $R_u$ becomes 10%.

In this way, when the resistance values become large due to generation of heat caused by an electric current, the interphase resistance differences become relatively small. Accordingly, as seen from the viewpoint of the interphase resistance differences, generation of heat caused by an electric current degrades the calculation accuracy of the phase resistances. Hence, it is preferable to calculate the phase resistances when generation of heat caused by an electric current is small. Thus, in this embodiment, when the instruction value or detection values of the u-phase, v-phase, and w-phase currents are smaller than predetermined threshold values, the phase resistances $R_u$, $R_v$, and $R_w$ are calculated as described above. Hereinafter, the operation of the phase resistance calculating unit 143 in this embodiment will be described.

Figure 11:
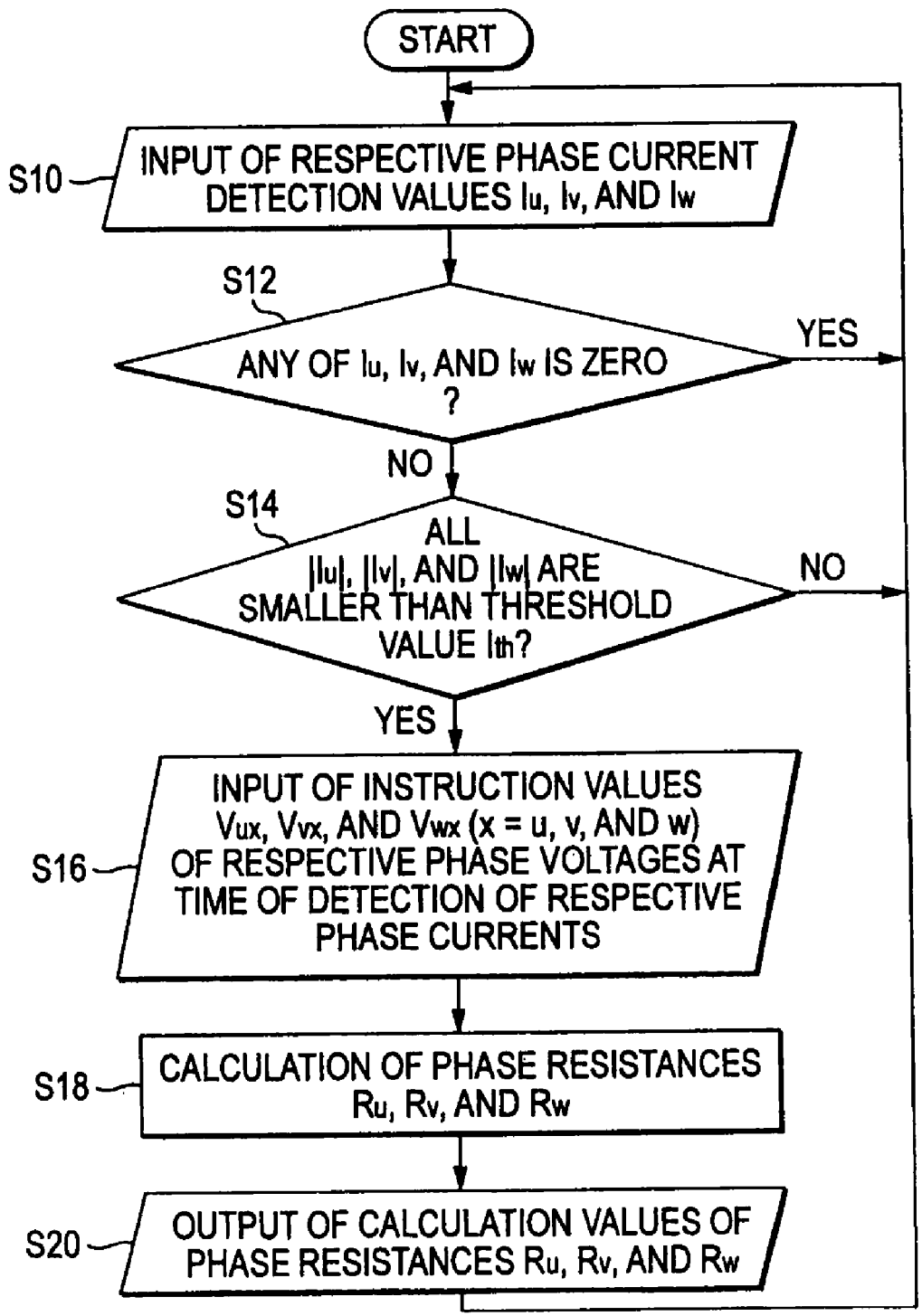
FIG. 11 is a flow chart for explaining an example of the operation of a phase resistance calculating unit in the above third embodiment.

FIG. 11 is a flow chart for explaining an example of the operation of the phase resistance calculating unit in the third embodiment. In this example of operation, the phase resistance calculating unit 143 calculates the phase resistances $R_u$, $R_v$, and $R_w$ according to the following procedure. As earlier mentioned, whenever any one of the u-phase, v-phase, and w-phase current detection values is calculated from the current detection value $I_a$ from obtained by the current sensor 14, the phase current calculating unit 141 gives the phase current detection value $I_x$ to the phase resistance calculating unit 143 (x is any one of u, v, and w), and the phase resistance calculating unit 143 receives the phase current detection value $I_x$ sequentially (Step S10). The phase resistance calculating unit 143 returns to Step S10 if the received phase current detection value $I_x$ are zero, and receives the phase current detection values $I_y$ to be calculated next (y is any one of u, v, and w). By repeating Steps S10 and S12 in this way, when the u-phase, v-phase and w-phase current detection values $I_u$, $I_v$, and $I_w$ which are not zero are received, the phase resistance calculating unit 143 determines whether or not all absolute values $|I_u|$, $|I_v|$, and $|I_w|$ of the phase current detection values are smaller than a predetermined threshold $I_{th}$ and as a result, returns to Step S10 if any one of $|I_u|$, $|I_v|$, and $|I_w|$ is equal to or more than the threshold value $I_{th}$, or proceeds to Step S16 if all of $|I_u|$, $|I_v|$, and $|I_w|$ are smaller than the threshold value $I_{th}$. Here, the threshold value $I_{th}$ is introduced in order to prevent degradation of the calculation accuracy of the phase resistances due to generation of heat caused by an electric current as mentioned earlier, and is set so that the phase resistances are calculated within a range where an increase in phase resistance caused by generation of heat is comparatively small. The concrete value of the threshold value changes depending on brushless motors, and motor control devices which drive the motors, and are practically determined using experiments regarding individual brushless motors and motor control devices, computer simulation, or the like.

When the processing has proceeded to Step S16, the phase current detection value $I_x$ (x=u, v, and w) all of which are not zero, and the absolute values of which are smaller than the threshold value $I_{th}$ are obtained. The phase resistance calculating unit 143 takes out the respective phase voltage instruction values $V_{ux}$, $V_{vx}$, and $V_{wx}$ (after correction) at the time of the detection of the respective phase current detection value $I_x$ from the storage unit 142, and calculates the phase resistances $R_u$, $R_v$, and $R_w$ based on Equations (29a) to (33c) as earlier mentioned, using the respective phase voltage instruction values $V_{ux}$, $V_{vx}$, and $V_{wx}$ (x=u, v, and w), and the above respective phase current detection value $I_x$.

The calculation values of the phase resistances $R_u$, $R_v$, and $R_w$ obtained as described above are given to the correction unit 144 from the phase resistance calculating unit 143 (Step S20). The correction unit 144 corrects the phase voltage instruction values $V_u$, $V_v$, and $V_w$ based on Equations (20) to (22) as earlier mentioned, using the calculation values of the phase resistances $R_u$, $R_v$, and $R_w$.

After the phase resistances $R_u$, $R_v$, and $R_w$ are calculated in this way, the processing returns to Step S10 in order to calculate the phase resistances $R_u$, $R_v$, and $R_w$ based on the respective new phase current detection value $I_x$.

In addition, the operation of the phase resistance calculating unit 143 according to the procedure shown in FIG. 11 is an example, and the operation of the phase resistance calculating unit 143 is not limited to such a procedure. For example, the processing of Steps S10 to S20 shown in FIG. 11 may be executed at predetermined time intervals. Additionally, the processing of Steps S10 to S20 shown in FIG. 11 may be executed only once after the start of driving of the brushless motor 1, and may be executed when the state of temperature or the like has changed.

In the example of operation shown in FIG. 11, if the determination result of Step S12 is "No", and the determination result of Step S14 is "Yes", the instruction values $V_{ux}$, $V_{vx}$, and $V_{wx}$ of the respective phase voltages at the time of the detection of the respective phase currents are taken out from the storage unit 142. Instead of this, however, whenever any one phase current detection value $I_x$ is obtained, it may be determined whether or not the phase current detection value $I_x$ is not zero and the absolute value thereof is smaller than the threshold value $I_{th}$. Then, if the phase current detection value $I_x$ is not zero, and the absolute value thereof is smaller than the threshold value $I_{th}$ in-between parameter values $X_a$ and $X_b$ corresponding to the current detection values $I_x$, (x=u, v, and w; X=U, V, and W) may be calculated based on Equations (29a) and (29b); (30a) and (30b); or (31a) and (31b).

Additionally, in the example of operation shown in FIG. 11, it is determined in Step S14 whether or not the absolute values of the detection values of the respective phase currents are smaller than the threshold value $I_{th}$. Instead of this, however, it may be determined whether or not the absolute values of the instruction values of the respective phase currents are smaller than the threshold value $I_{th}$. In this case, the instruction values of the respective phase currents can be obtained by converting the d-axis and q-axis current instruction values $i_d^*$, and $i_q^*$ acquired by the instruction current calculating unit 21 into values on the 3-phase alternating-current coordinate axes. Additionally, instead of these, it may be determined whether or not the absolute values or square sum of the d-axis and q-axis current instruction values $i_d^*$, and $i_q^*$ are smaller than a predetermined threshold value. More generally, when the magnitude of an electric current which flows into the brushless motor 1 is smaller than a predetermined value, the phase resistances $R_u$, $R_v$, and $R_w$ may be calculated, so that degradation in the phase resistance calculation accuracy resulting from generation of heat caused by an electric current can be prevented.

Additionally, even if the absolute values of the respective phase current values are smaller than a threshold value predetermined, and generation of heat is small, if the respective phase current values $I_u$, $I_v$, and $I_w$ in Equations (29a) to (31b) are close to zero, an error is apt to occur. Thus, in addition to the determination of Step S14, it may be determined whether or the not absolute values $|I_u|$, $|I_v|$, and $|I_w|$ of the respective phase current detection values are greater than another threshold value $I_{th2}$ (here, $I_{th}>I_{th2}$), and only if the absolute values are greater than the threshold value $I_{th2}$, the phase resistances may be calculated.

As described above, according to this embodiment, the phase resistances $R_u$, $R_v$, and $R_w$ are calculated using the detection values $I_x$ of the respective phase currents, and the instruction values $V_{ux}$, $V_{vx}$, and $V_{wx}$ (x=u, v, and w) of the respective phase voltages at the time of the detection, and the instruction values $V_y$ of the respective phase voltages at this time are corrected according to the values of the phase resistances $R_y$ (y=u, v, and w). That is, the respective phase voltage instruction values $V_u$, $V_v$, and $V_w$ are corrected according to Equations (20) to (22), using the calculation values of the phase resistances $R_u$, $R_v$, and $R_w$. Here, Equations (20) to (22) show that the respective phase voltage instruction values $V_y$ are corrected so that portions equivalent to applied voltages to the phase resistances $R_y$ among the respective phase voltage instruction values $V_y$ are proportional to the values of the resistances $R_y$ (y=u, v, and w). An interphase resistance difference is compensated by such correction, and the torque ripple resulting from the interphase resistance difference is reduced. Accordingly, according to the electric power steering device using the motor control device related to this embodiment, the output torque of the motor becomes smooth, and the steering feel is improved.

Moreover, according to this embodiment, the values of the phase resistances $R_u$, $R_v$ and $R_w$ used for correction of the phase voltage instruction values are calculated when the respective phase currents are small and an increase in resistance value caused by generation of heat is small. Thus, the phase resistances $R_u$, $R_v$, and $R_w$ are calculated with high precision. Thereby, compensation of the interphase resistance differences by correction of the phase voltage instruction values is more accurately performed, and as a result, the torque ripple can be sufficiently reduced.

7. Fourth Embodiment

Figure 12:
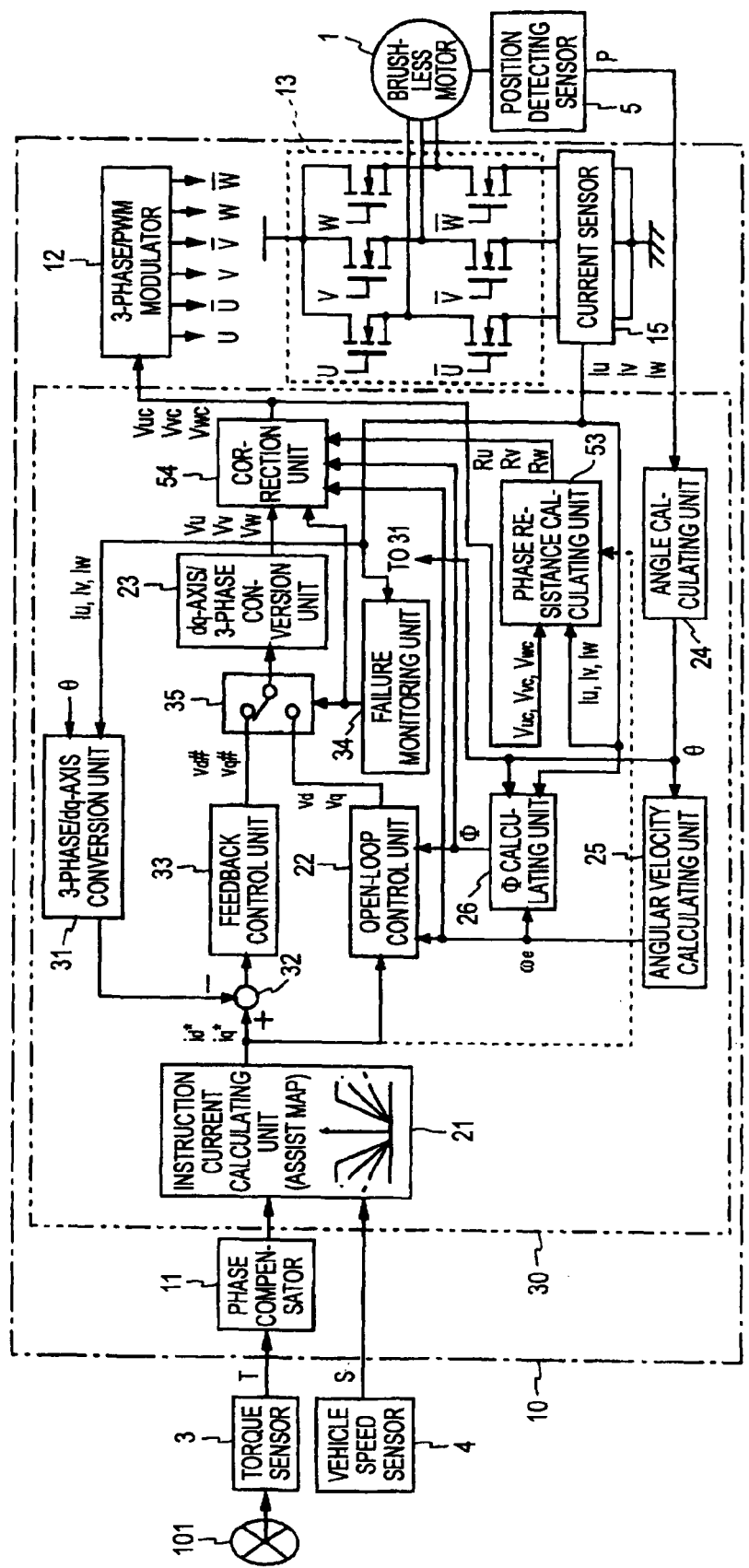
FIG. 12 is a block diagram showing the configuration of a motor control device related to a fourth embodiment of the invention.

FIG. 12 is a block diagram showing the configuration of a motor control device related to a fourth embodiment of the invention. The motor control device related to this embodiment is obtained by replacing the microcomputer 20 and the current sensor 14 in the motor control device related to the third embodiment with a microcomputer 30 and a current sensor 15. This motor control device performs a feedback control when the current sensor 15 is normally operating, and performs an open loop control when the current sensor 15 has failed. That is, the fourth embodiment is the same as the second embodiment to the first embodiment. In the following description, the same reference numerals will be given to the same components as the second embodiment, and the descriptions thereof are omitted.

Even in the microcomputer 30, the phase resistance calculating unit 153 and the correction unit 154 are included similarly to the above third embodiment. In this embodiment, however, the 3-phase driving currents supplied to the brushless motor 1 are individually detected. Therefore, the phase current calculating unit 141 and the storage unit 142 are not included.

While the current sensors 15 are normally operating, the phase resistance calculating unit 53 calculates the phase resistances $R_u$, $R_v$, and $R_w$ similarly to the above third embodiment. That is, the phase resistance calculating unit 143 obtains the values of the u-phase resistance $R_u$, the v-phase resistance $R_v$, and the w-phase resistance $R_w$ in the brushless motor 1, based on the respective phase current detection values $I_u$, $I_v$, and $I_w$ detected by the current sensors 15, and the phase voltage instruction values $V_{uc}$, $V_{vc}$, and $V_{wc}$ after correction at the time of the detection. Here, the u-phase, v-phase, and w-phase current detection values $I_u$, $I_v$, and $I_w$ are simultaneously detected. For this reason, the phase voltage instruction values $V_{uc}$, $V_{vc}$, and $V_{wc}$ at the time of the above detection correspond to the respective phase voltage instruction values $V_{ux}$, $V_{vx}$, and $V_{wx}$ (x=u, v, and w) at the time of the detection of the respective phase currents in the first embodiment. Accordingly, if "$V_{ux}$, $V_{vx}$, and $V_{wx}$ (x=u, v, and w)" in the flow chart shown in FIG. 11 are replaced with "$V_{uc}$, $V_{vc}$, and $V_{wc}$", this flow chart shows the example of operation in this embodiment. Thus, the detailed description regarding the phase resistance calculating unit 53 is omitted.

The calculation values of the phase resistance $R_u$, $R_v$, and $R_w$ obtained by the phase resistance calculating unit 53 are given to the correction unit 54. Similarly to the above first embodiment, along with the calculation values of the phase resistances $R_u$, $R_v$, and $R_w$, the armature winding interlinking magnetic flux number $\Phi$ is given to the correction unit 54 from the $\Phi$ calculating unit 26, and the angular velocity $\omega_e$ is given to the correction unit from the angular velocity calculating unit 25. Moreover, a control signal showing a determination result in the failure monitoring unit 34 is also given to the correction unit 54.

Meanwhile, while the current sensors 15 are normally operating, the feedback control is performed so that the deviation $E_d$ between the d-axis current instruction value $i_d^*$ and the d-axis current detection value $i_d$ and the deviation $E_q$ between the q-axis current instruction value $i_q^*$ and the q-axis current detection value $i_q$ are cancelled. Therefore, generally, the generation of the torque ripple resulting from the interphase resistance difference does not become a problem. Thus, in this embodiment, the correction unit 54 gives the phase voltage instruction values $V_u$, $V_v$, and $V_w$, which are output from the dq-axis/3-phase conversion unit 23, to the 3-phase/PWM modulator 12 as they are, without correcting the phase voltage instruction values while the current sensors 15 are normally operating, i.e., while the feedback control is performed, based on the above control signal from the failure monitoring unit 34. That is, $V_u=V_{uc}$, $V_v=V_{vc}$, and $V_w=V_{wc}$ are established. However, even while the feedback control is performed, the phase voltage instruction values $V_u$, $V_v$, and $V_w$ may be corrected using the calculation values of the above phase resistances $R_u$, $R_v$, and R.

Thereafter, when the current sensors 15 fail, the failure monitoring unit 34 determines that a current sensor have failed, and the instruction voltage selecting unit 35 selects the output of the open-loop control unit 22. At this time, the instruction current calculating unit 21, the open-loop control unit 22, the dq-axis/3-phase conversion unit 23, and the angle calculating unit 24 operate, and the open loop control is performed. The open-loop control unit 22 obtains the d-axis voltage instruction value $v_d$ and the q-axis voltage instruction value $v_q$, using the $\Phi$ value obtained while the current sensors 15 are normally operating. The d-axis voltage instruction value $v_d$ and the q-axis voltage instruction value $v_q$ are given to the dq-axis/3-phase conversion unit 23 via the instruction voltage selecting unit 35, and are converted into the phase voltage instruction values $V_u$, $V_v$, and $V_w$ in the instruction voltage selecting unit. The phase voltage instruction values $V_u$, $V_v$, and $V_w$ are given to the correction unit 54.

The correction unit 54 corrects the phase voltage instruction values $V_u$, $V_v$, and $V_w$ according to Equations (20) to (22) as mentioned earlier, using the calculation values of the phase resistance $R_u$, $R_v$, and $R_w$ from the phase resistance calculating unit 53, the armature winding interlinking magnetic flux number $\Phi$ from the $\Phi$ calculating unit 26, and the angular velocity $\omega_e$ from the angular velocity calculating unit 25, similarly to the above first embodiment, when a current sensor 15 fails, based on the control signal from the failure monitoring unit 34. The phase voltage instruction values $V_{uc}$, $V_{vc}$, and $V_{wc}$ after this correction are given to the 3-phase/PWM modulator 12. A motor driving means including the 3-phase/PWM modulator 12 and the motor drive circuit 13 drives the brushless motor 1 by the voltages of the phase voltage instruction values $V_{uc}$, $V_{vc}$, and $V_{wc}$.

As shown above, similarly to the second embodiment, when a current sensor fails, and the feedback control cannot be performed, the brushless motor can be driven with high precision to obtain a desired motor output, by performing the open loop control, using the armature winding interlinking magnetic flux number $\Phi$ obtained while the feedback control is performed.

Additionally, according to the fourth embodiment, in a case where the open loop control is performed, the phase voltage instruction values $V_u$, $V_v$, and $V_w$ are corrected by the correction unit 54 so that the interphase resistance differences are compensated (refer to Equations (20) to (22)), using the values of the phase resistances $R_u$, $R_v$, and $R_w$ obtained while the current sensors are normally operating. For this reason, according to the motor control device related to this embodiment, generation of the torque ripple resulting from the interphase resistance difference is suppressed. Accordingly, even in a case where a current sensor fails, and the feedback control cannot be performed, a favorable steering feel can be obtained.

8. Modification

Although only one current sensor 14 is provided in the above first embodiment, a plurality of (two or three) may be provided. For example, in a case where current sensors for u-phase and v-phases are provided, the u-phase and v-phase current detection values used for the calculation of the phase resistances $R_u$, $R_v$, and $R_w$ in the phase resistance calculating unit 143 may use the u-phase current detection value $I_u$ and v-phase current detection value $I_v$ output from the current sensors for u-phase and v-phase, and the w-phase current detection value $I_w$ may be obtained according to the following equation in the phase current calculating unit 141.

$I_w = -I_u - I_v$. In addition, in a case where a plurality of the current sensors 14 is provided, the u-phase, v-phase, and w-phase current detection values can be obtained at the same time. Thus, the storage unit 142 is not necessarily required. In a case where three current sensors 14 are provided, the phase current calculating unit 141 becomes unnecessary (in a case where current sensors are provided by a number equal to the number of phases). In this case, a current detecting means is constituted by the plurality of current sensors.

Additionally, in the first and second embodiments, the phase voltage instruction values $V_u$, $V_v$, and $V_w$ are corrected according to Equations (7) to (9) based on the phase resistances $R_u$, $R_v$, and $R_w$. However, the invention is not limited to the correction by such Equations (7) to (9). More generally, the respective phase voltage instruction values $V_x$ may be corrected so that portions equivalent to applied voltages to the phase resistances $R_x$ among the respective phase voltage instruction values $V_x$ have the positive relationship with the values of the resistances $R_x$ in order to compensate the interphase resistance differences (x=u, v, and w).

Meanwhile, when the angular velocity $\omega_e$ of the rotor of the brushless motor 1 is large, the counter-electromotive force becomes large, and the ratios of applied voltages to the phase resistances $R_u$, $R_v$, and $R_w$ become small. Thus, the influence of the calculation error of the counter-electromotive force is easily received, and the calculation accuracy of the phase resistances $R_u$, $R_v$, and $R_w$ degrades. Accordingly, only when the angular velocity $\omega_e$ as to a threshold value is provided, and only when the angular velocity $\omega_e$ is smaller than the threshold value, the phase resistances $R_u$, $R_v$, and $R_w$ may be calculated.

Additionally, the motor control device related to the first and second embodiments is configured so as to drive the 3-phase brushless motor 1. However, the invention is not limited to this, and can also be applied to a motor control device which drives a brushless motor of four or more phases.

Additionally, in the motor control device related to the second embodiment, the feedback control and the open loop control are switched to each other by the determination result in the failure monitoring unit 34. However, the feedback control and the open loop control may be switched to each other by determination (for example, by driver's selection) other than determination in the failure monitoring unit 34.

In addition, the invention can be applied not only to the above-descried column assist type electric power steering device but also a pinion assist type or rack assist type electric power steering device. Additionally, the invention can also be applied to motor control devices other than the electric power steering device.

9. Fifth Embodiment

Next, a motor control device related to a fifth embodiment of the invention will be described with reference to FIGS. 13 to 16. The motor control device related to the fifth embodiment, similarly to the above embodiment, is used for the electric power steering device shown in FIG. 1. Hence, description of the electric power steering is omitted herein.

Figure 13:
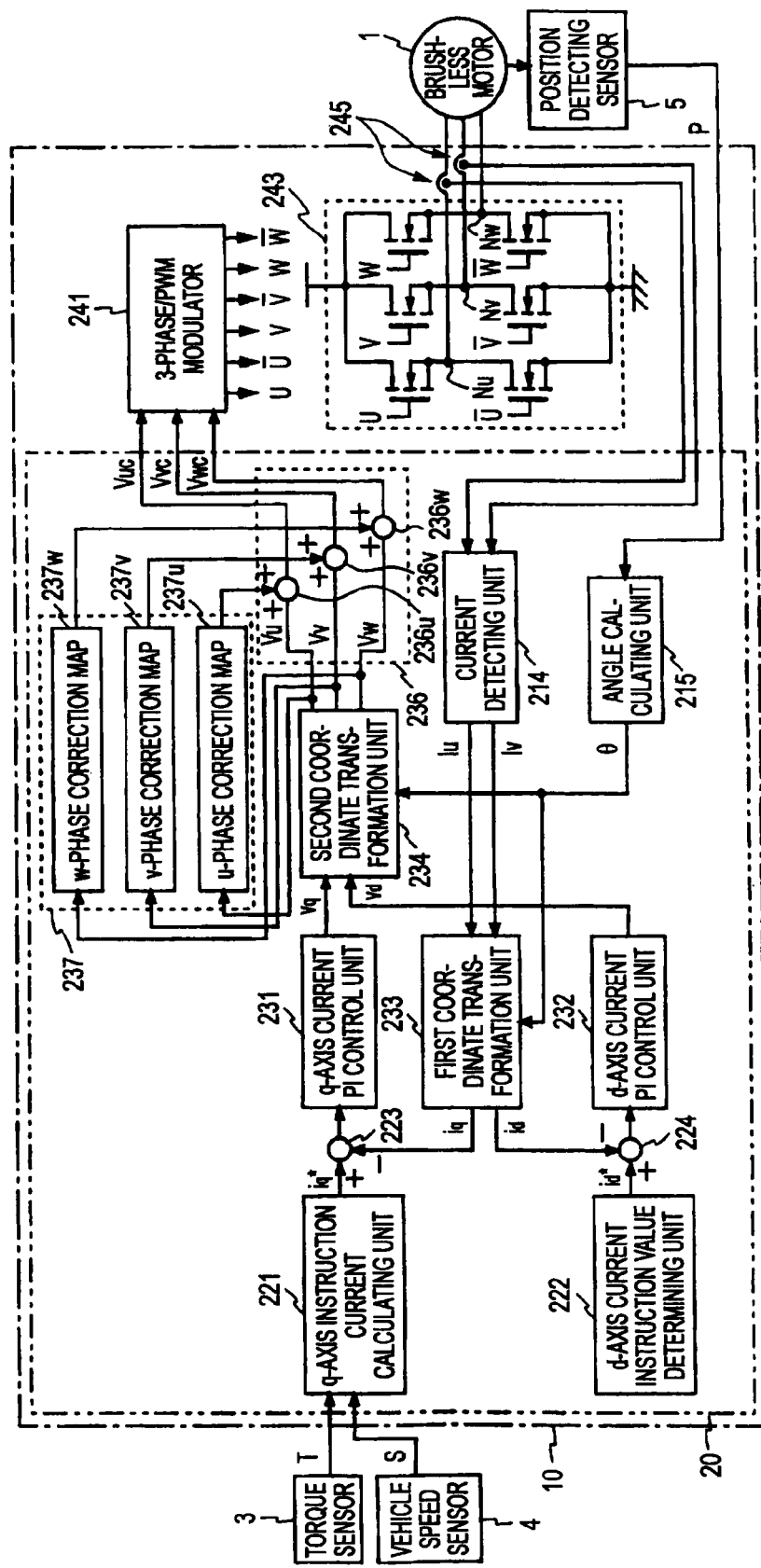
FIG. 13 is a block diagram showing the configuration of a motor control device related to a fifth embodiment of the invention.

FIG. 13 is a block diagram showing the configuration of the motor control device related to this embodiment. The motor control device shown in FIG. 13 is configured using the ECU 10, and drives the brushless motor 1 which has windings (not shown) of three phases including u-phase, v-phase, and w-phase. The ECU 10 includes a microcomputer (hereinafter abbreviated as a microcomputer) 20, a 3-phase/PWM (Pulse Width Modulation) modulator 241, a motor drive circuit 243, and a current sensor 245.

The steering torque T output from the torque sensor 3, the vehicle speed S output from the vehicle speed sensor 4, and the rotational position P output from the position detecting sensor 5 are input to the ECU 10. The microcomputer 20 functions as a control means which calculates a voltage instruction value used for the driving of the brushless motor 1. The functions of the microcomputer 20 will be described below in detail.

The 3-phase/PWM modulator 241, and the motor drive circuit 243 are constituted by hardware (circuits), and function as a motor driving means which drives the brushless motor 1, using the voltage of the voltage instruction value obtained by the microcomputer 20. The 3-phase/PWM modulator 241 creates three kinds of PWM signals (U, V, and W shown in FIG. 13) which have duty ratios according to 3-phase voltage instruction values obtained by the microcomputer 20. The motor drive circuit 243 is a PWM voltage type inverter circuit including six MOS-FETs (Metal Oxide Semiconductor Field Effect Transistor) as switching elements. The six MOS-FETs are controlled by three kinds of PWM signals and negative signals thereof. That is, in the motor drive circuit 243, two MOS-FETs are assigned to each phase, and the two MOS-FETs are mutually connected in series to form a switching element pair, and an inverter is constituted as such switching element pairs are connected in parallel between a power supply terminal and a grounding terminal by the number of phases. Also, a connection point between the two MOS-FETs (switching element pair) corresponding to each phase is connected to the brushless motor 1 as an output end of the phase in the inverter. The conduction state of the two MOS-FETs corresponding to each phase is controlled by two PWM signals (two PWM signals which have an inversion relationship mutually) corresponding to the phase. Thereby, voltages obtained at u-phase, v-phase, and w-phase output ends $N_u$, $N_v$, and $N_w$ are applied to the brushless motor 1 as a u-phase voltage, a v-phase voltage, and a w-phase voltage, respectively. As the voltages are applied to the brushless motor 1 in this way, the u-phase current, v-phase current, and w-phase currents are supplied to the brushless motor 1 from the motor drive circuit 243.

The current sensor 245 outputs detection signals showing the u-phase current and v-phase current supplied to the brushless motor 1, and these detection signals are input to the microcomputer 20.

The microcomputer 20 executes programs stored in a memory (not shown) built in the ECU 10, thereby functioning as a q-axis current instruction value determining unit 221, a d-axis current instruction value determining unit 222, subtracters 223 and 224, a q-axis current PI control unit 231, a d-axis current PI control unit 232, a first coordinate transformation unit 233, a second coordinate transformation unit 234, a correction calculating unit 236, a correction storage unit 237, a current detecting unit 214, and an angle calculating unit 215. In addition, the q-axis current instruction value determining unit 221, the d-axis current instruction value determining unit 222, the subtracters 223 and 224, the q-axis current PI control unit 231, the d-axis current PI control unit 232, the first and second coordinate transformation unit 233 and 234, the current detecting unit 214, and the angle calculating unit 215 constitute a control calculation means which obtains the phase voltage instruction values $V_u$, $V_v$, and $V_w$ showing phase voltages to be applied to the brushless motor 1. Additionally, the correction calculating unit 236 includes three adders $236_u$, $236_v$, and $236_w$ corresponding to u, v, and w-phases of the brushless motor 1, respectively, and the correction storage unit 237 stores u-phase, v-phase, and w-phase correction maps $237_u$, $237_v$, and $237_w$. Such correction calculating unit 236 and correction storage unit 237 constitute a correction means which corrects the above phase voltage instruction values $V_u$, $V_v$, and $V_w$.

The microcomputer 20, as shown below, obtains the voltage instruction values $V_{uc}$, $V_{vc}$, and $V_{wc}$ showing voltages to be given to the motor drive circuit 243, based on current instruction values showing electric currents to be supplied to the brushless motor 1, and the rotational angle (electric angle) of the rotor of the brushless motor 1. In addition, in the following, when description is made while paying attention to an arbitrary one phase of u-phase, v-phase, and w-phase, the phase to which attention is paid is referred to as an "x-phase" for convenience.

The q-axis current instruction value determining unit 221 determines the q-axis current instruction value $i_q^*$ showing the q-axis component of an electric current to be supplied to the brushless motor 1 based on the steering torque T detected by the torque sensor 3, and the vehicle speed S detected by the vehicle speed sensor 4. The q-axis current instruction value $i^*_q$ is a current value corresponding to the torque to be generated by the brushless motor 1, and is input to the subtracter 223. On the other hand, the d-axis current instruction value determining unit 222 determines the d-axis current instruction value $i_d^*$ showing the d-axis component of an electric current to be supplied to the brushless motor 1. Since the d-axis component of an electric current which flows into the brushless motor 1 is not involved in torque, $i_d^*=0$ is typically established. The d-axis current instruction value $i_d^*$ is input to the subtracter 224.

The current detecting unit 214 outputs the detection values of the u-phase current and the v-phase current among electric currents supplied to the brushless motor 1 from the motor drive circuit 243, as the u-phase current detection value $I_u$ and the v-phase current detection value $I_v$, respectively, based on the detection signal from the current sensor 245. The u-phase and v-phase current detection values $I_u$ and $I_v$ are given to the first coordinate transformation unit 233. Additionally, the angle calculating unit 215 obtains the electric angle θ showing the rotational position of the rotor of the brushless motor 1 based on the rotational position P detected by the position detecting sensor 5. The electric angle θ is given to the first and second coordinate transformation units 233 and 234. In addition, when a u-axis, a v-axis, and a w-axis are set for the brushless motor 1 as shown in FIG. 3, and a d-axis and a q-axis are set for the rotor 6 of the brushless motor 1, the angle formed by the u-axis and the d-axis becomes the electric angle θ.

The first coordinate transformation unit 233 transforms the above u-phase and v-phase current detection values $I_u$ and $I_v$ into the q-axis and d-axis current detection values $i_q$ and $i_d$ which are values on the dq coordinate, according to the following Equations (34) and (35), using the electric angle θ.

$$i_d = \sqrt{2} \times \{I_v \times \sin\theta - I_u \times \sin(\theta - 2\pi/3)\} \quad (34)$$

$$i_q = \sqrt{2} \times \{I_v \times \cos\theta - I_u \times \cos(\theta - 2\pi/3)\} \quad (35)$$

The q-axis and d-axis current detection values $i_q$ and $i_d$ obtained in this way are input to the subtracters 223 and 224, respectively.

The subtracter 223 calculates a q-axis current deviation $(i^*_q - i_q)$ which is the deviation between the q-axis current instruction value $i^*_q$ and the q-axis current detection value $i_q$, and the q-axis current PI control unit 231 calculates the q-axis voltage instruction value $v_q$ by proportional integral control operation of the q-axis current deviation $(i^*_q - i_q)$. The subtracter 224 calculates a d-axis current deviation $(i^*_d - i_d)$ which is the deviation between the d-axis current instruction value $i^*_d$ and the d-axis current detection value $i_d$, and the d-axis current PI control unit 232 calculates the d-axis voltage instruction value $v_d$ by proportional integral control operation of the d-axis current deviation $(i^*_d - i_d)$. The q-axis and d-axis voltage instruction values $V_q$ and $V_d$ obtained in this way are input to the second coordinate transformation unit 234.

The second coordinate transformation unit 234 transforms the above q-axis and d-axis voltage instruction values $v_q$ and $v_d$ into the phase voltage instruction values $V_u$, $V_v$, and $V_w$ which are values on the 3-phase alternating-current coordinate (hereinafter, the phase voltage instruction values $V_u$, $V_v$, and $V_w$ are also referred to as a "u-phase voltage instruction value $V_u$", a "v-phase voltage instruction value $V_v$", and a "w-phase voltage instruction value $V_w$", respectively), according to the following Equations (36) to (38), using the electric angle θ.

$$V_u = \sqrt{(2/3)} \times \{v_d \times \cos\theta - v_q \times \sin\theta\} \quad (36)$$

$$V_v = \sqrt{(2/3)} \times \{v_d \times \cos(\theta - 2\pi/3) - v_q \times \sin(\theta - 2\pi/3)\} \quad (37)$$

$$V_w = -V_u - V_v \quad (38)$$

The phase voltage instruction values $V_u$, $V_v$, and $V_w$ are given to the adders $236_u$, $236_v$, and $236_w$ of the correction calculating unit 236, respectively, and are given to the u-phase, v-phase, and w-phase correction maps $237_u$, $237_v$, and $237_w$ stored in the correction storage unit 37, respectively.

The x-phase correction map $237_x$ (x=u, v, and w) is a map for correlating an x-phase voltage instruction value with the amount of correction required for the voltage instruction value. The amount of correction corresponding to an x-phase voltage instruction value $V_x$ is obtained by the x-phase correction map $237_x$, and the amount of correction is given to an adder $236_x$ corresponding to the x-phase in the correction calculating unit 236, respectively (x=u, v, and w).

In the correction calculating unit 236, the adder $236_x$ corresponding to the x-phase correct the x-phase voltage instruction value $V_x$ by adding the amount of correction obtained by the x-phase correction map $237_x$ to the x-phase voltage instruction value $V_x$ (x=u, v, and w). The u-phase v-phase and w-phase voltage instruction values $V_{uc}$, $V_{vc}$, and $V_{wc}$ after correction obtained in this way are given to the 3-phase/PWM modulator 241.

As mentioned earlier, the 3-phase/PWM modulator 241 creates three kinds of PWM signals U, V and W which have duty ratios according to the phase voltage instruction values $V_{uc}$, $V_{vc}$, and $V_{wc}$ after correction, and negative signals thereof. The motor drive circuit 243 is controlled by the three kinds of PWM signals and negative signals thereof, and thereby, the 3-phase driving currents (the u-phase current, the v-phase current, and the w-phase current) are supplied to the brushless motor 1. Thereby, the brushless motor 1 is rotated to generate torque.

In addition, the current sensor 245 is inserted into u-phase and v-phase current paths among current paths to the brushless motor 1 from the motor drive circuit 243, and the current sensor 245 outputs detection signals showing u-phase and v-phase currents supplied to the brushless motor 1 as mentioned earlier. Additionally, the rotational position P of the rotor of the brushless motor 1 is detected by the position detecting sensor 5 as mentioned earlier. The detection signals showing the u-phase and v-phase currents, and the detection signal showing the rotational position P are input to the microcomputer 20, and are used for the driving control of the brushless motor 1 as described above.

10. Regarding Correction of Phase Voltage Instruction Value

In order to suppress the ripple (torque ripple) included in the output torque of the brushless motor 1, it is preferable to form the circuit pattern of a motor driving circuit board (a circuit board on which the motor drive circuit 243 is mounted) so that an interphase resistance difference is not caused in a motor/driving circuit system. However, even if the wiring pattern is formed so that a difference between phases is not caused in resistance components of paths ranging from a power supply terminal to a grounding terminal, a torque ripple is generated as to each phase if a difference is between the resistance component (hereinafter referred to as an "upper stage arm resistance") of a path from the power supply terminal to the output end of the motor drive circuit 243, and the resistance component (hereinafter referred to as a "lower stage arm resistance") of a path from the relevant output end to the grounding terminal. On the other hand, when the wiring pattern is formed so that not only an interphase resistance difference is not caused in the motor/driving circuit system, but also, the upper stage arm resistance and the lower stage arm resistance become equal to each other as to each phase, the circuit pattern in the motor driving circuit board becomes complicated, and the space for forming the circuit pattern increases.

Thus, in this embodiment, the difference (hereinafter referred to as an "upper and lower stage resistance difference") caused between the upper stage arm resistance and the lower stage arm resistance as to each phase is permitted in order to suppress an increase in the area of the motor driving circuit board. The phase voltage instruction values $V_u$, $V_v$, and $V_w$ are corrected by a correction means including the above correction calculating unit 236 and correction storage unit 237 so that the upper and lower stage resistance difference is compensated for each phase in order to suppress generation of the torque ripple. Hereafter, the details of correction by the correction means will be described.

In this embodiment, the amounts of correction to be added to the phase voltage instruction values $V_u$, $V_v$, and $V_w$ in the correction calculating unit 236 in order to compensate upper and lower stage resistance differences are calculated with reference to a correction map prepared for every phase. That is, the amounts of correction added to the u-phase, v-phase and w-phase voltage instruction values $V_u$, $V_v$, and $V_w$ are the amounts of correction correlated with the u-phase, v-phase and w-phase voltage instruction values $V_u$, $V_v$, and $V_w$, respectively by the u-phase, v-phase, and w-phase correction maps $237_u$, $237_v$, and $237_w$. Such u-phase, v-phase, and w-phase correction maps $237_u$, $237_v$, and $237_w$ can be set so that concrete handling methods of the phase voltage instruction values and the amounts of correction are different from each other. However, the methods of making or using the correction maps are the same in any correction maps. Thus, in the following, the u-phase, v-phase, and w-phase will be representatively described by the x-phase.

Figure 14:
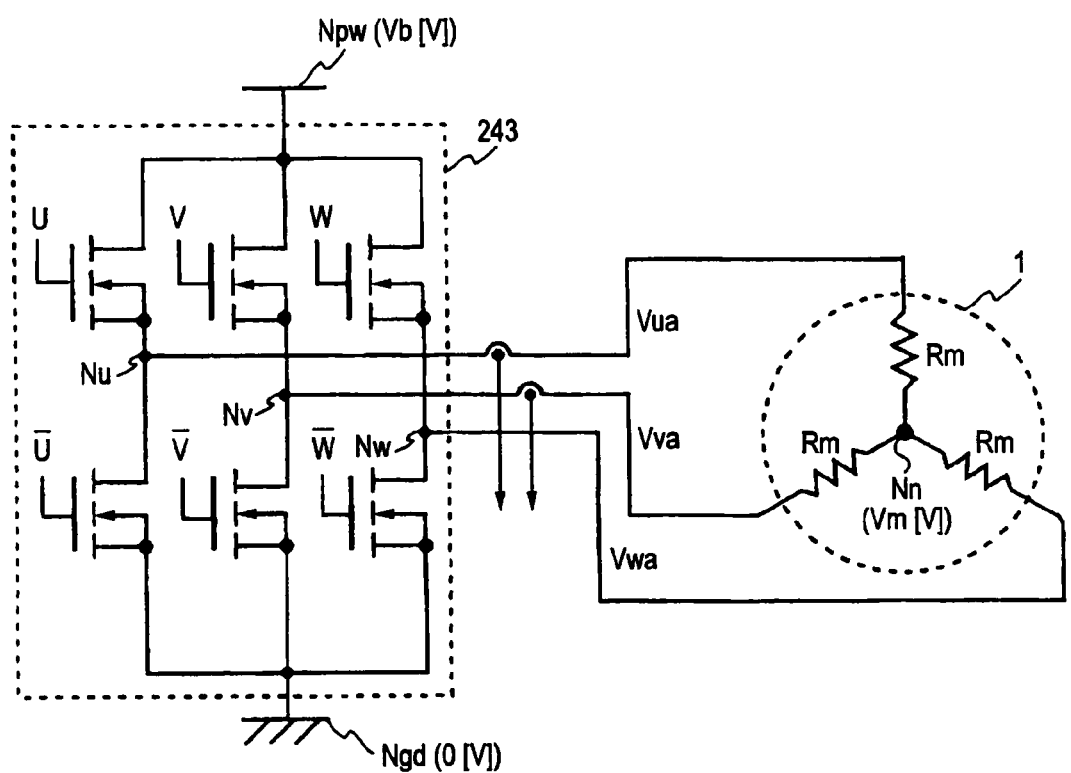
FIG. 14 is a view for explaining the making of a correction map in the above embodiment.

FIG. 14 is a circuit diagram for explaining making of the x-phase correction map $237_x$ in this embodiment, and shows the circuit configuration of the motor/driving circuit system including the motor drive circuit 243 and the brushless motor 1. A resistance component from a power supply terminal $N_{pw}$ to an x-phase output end $N_x$, i.e., the x-phase upper stage arm resistance includes the ON resistance and wiring resistance of a switching element (FET) at the upper stage arm, and a resistance component from the x-phase output end $N_x$ to a grounding terminal $N_{gd}$, i.e., the x-phase lower stage arm resistance includes the ON resistance and wiring resistance of a switching element (FET) at the at the lower stage arm. In addition, although not shown in FIG. 15, a counter-electromotive force is generated in each phase of the brushless motor 1 in a case where the brushless motor 1 is rotating. Hereinafter, the making of the x-phase correction map will be described with reference to FIG. 14 (x=u, v, and w).

In a circuit board (motor driving circuit board) on which the motor drive circuit 243 is mounted, even if a wiring pattern is formed so that resistance components of paths ranging from the power supply terminal $N_{pw}$ to the grounding terminal $N_{gd}$ are equal to each other between phases, a voltage $V_{xa}$ of the output end $N_x$ deviates from an original voltage when a difference (upper and lower stage resistance difference) exists between the upper stage arm resistance and the lower stage arm resistance as to the X-phase. In this embodiment, the amount of corrections of the x-phase voltage instruction value $V_x$ for compensating this voltage deviation is given by the x-phase correction map $237_x$.

The voltage $V_{xa}$ of the x-phase output end $N_x$ of the motor drive circuit 243 becomes $$V_{xa} = D_x \cdot V_b \quad (39)$$

ideally (in the case of $R_b = R_g = 0$) when the voltage of a direct current power source supplied to the motor drive circuit 243 is defined as $V_b$, and the duty ratio which is the ratio of an "ON" period of a switching element of the x-phase upper stage arm is defined as $D_x$. However, practically, the upper stage arm resistance $R_b$ and the lower stage arm resistance $R_g$ have values which are not zero, and $R_b \neq R_g$ is established. Thus, the voltage $V_{xa}$ of the output end deviates from a value $D_x \cdot V_b$ given by the above Equation (39).

Meanwhile, the x-phase voltage instruction value $V_x$ output from (the second coordinate transformation unit 234 of) the control calculation means corresponds to an x-phase duty ratio $D_x$ showing the ratio of the "ON" period of the switching element of the x-phase upper stage arm of the motor drive circuit 243, and $$D_x = V_x / V_b \quad (40)$$

is established. Since $R_b \neq R_g$ is established as described above, when two switching elements corresponding to the x-phase are driven at the duty ratio $D_x$ given by Equation (40), a voltage according to the phase voltage instruction value $V_x$ is not obtained to the output end $N_x$ of the motor drive circuit 243.

On the other hand, in this embodiment, the deviation of an actual output end voltage $V_{xa}$ to an ideal output end voltage $V_{xa}$ ($=D_x \cdot V_b = V_x$) corresponding to duty ratio $D_x$ as to various kinds of duty ratios $D_x$ is obtained using the design values or actual measurements of the upper stage arm resistance $R_b$ and the lower stage arm resistance $R_g$ in each phase, and the resistance component (hereinafter referred to as a "motor phase resistance") Rm of the brushless motor 1. As to the various kinds of duty ratios $D_x$, the amount of correction of the phase voltage instruction value $V_x$ ($=D_x \cdot V_b$) for compensating the above voltage deviation in the duty ratio $D_x$ is determined, and is stored in the correction storage unit 237 by using the data which correlates the amount of correction and the phase voltage instruction value $V_x$ thereof or the duty ratio $D_x$ as the x-phase correction map $237_x$ (x=u, v, and w).

In this embodiment, the phase voltage instruction value $V_{uc}$, $V_{vc}$, and $V_{wc}$ after correction are obtained by adding the amounts of correction obtained for every phase with reference to the u-phase, v-phase, and w-phase correction maps $237_u$, $237_v$, and $237_w$ which are made in this way to the phase voltage instruction values $V_u$, $V_v$, and V. According to the phase voltage instruction values $V_{uc}$, $V_{vc}$, and $V_{wc}$ after correction, the respective switching elements (FETs) of the motor drive circuit 243 serving as PWM voltage type inverters are driven (ON/OFF). Thereby, the voltages $V_{ua}$, $V_{va}$, and $V_{wa}$ obtained by the output ends $N_u$, $N_v$, and $N_w$ of the motor drive circuit 243 are applied to the brushless motor 1.

11. Specific Example of Making of Correction Map

In order to make the respective phase correction maps $237_u$, $237_v$, and $237_w$ to be used in this embodiment, as to each phase, it is necessary to obtain how far the output end voltage $V_{xa}$ (of the motor drive circuit 243) in various kinds of duty ratios $D_x$ deviates from an ideal value (=phase voltage instruction value $V_x$), using the design values or actual measurements of the upper stage arm resistance $R_b$, the lower stage arm resistance $R_g$, and the motor phase resistance $R_m$. The voltage deviation at such an output end $N_x$ can be obtained by simulating the operation of a system including the motor control device having the motor drive circuit 243 and the brushless motor 1 by a calculating machine, using the design values or actual measurements of the above resistance $R_b$, $R_g$, and $R_m$.

An equivalent circuit showing a configuration for one phase in the motor/driving circuit system (FIG. 14) including the motor drive circuit 243 and the brushless motor 1 is expressed based on a simple model, without performing such computer simulation, and the voltage deviation at the output end $N_x$ can be obtained based on the equivalent circuit for every phase. Hereinafter, a method of obtaining the voltage deviation of the output end $N_x$ in the x-phase by this simple model, and making the x-phase correction map $237_x$ based on the voltage deviation will be described (x=u, v, and w).

Both of FIGS. 15A and 15B are circuit diagrams showing the configuration for the x-phase which is equivalent to one phase of the motor/driving circuit system shown in FIG. 14. In the simple model using this circuit configuration for one phase, the counter-electromotive force in the brushless motor 1 is not taken into consideration. FIG. 15A shows a case where an x-phase current flows into the brushless motor 1 from the motor drive circuit 43, and FIG. 15B shows a case where the x-phase current flows into the motor drive circuit 43 from the brushless motor 1. Additionally, in FIGS. 15A and 15B, a resistance component including the ON resistance and wiring resistance of a switching element (hereinafter referred to as an "upper stage switching element") $SWX_u$ at an upper stage arm is shown by an upper stage arm resistance $R_b$, and a resistance component including the ON resistance and wiring resistance of a switching element $SWX_d$ (hereinafter referred to as a "lower stage switching element") at a lower stage arm is shown by a lower stage arm resistance $R_g$. In addition, $R_m$ shows the resistance component of the x-phase in the brushless motor 1.

As shown in FIG. 15A, in a case where an x-phase current flows into the brushless motor 1 from the motor drive circuit 243, when the upper stage switching element SWXu is in an ON state, the x-phase current $I_x$ thereof is $$I_x = (V_b - V_m)/(R_b + R_m) \quad (41).$$

Thus, the voltage $V_{xu}$ of the output end $N_x$ at this time becomes $$V_{xu} = (V_b - V_m) R_m/(R_b + R_m) + V_m \quad (42).$$

Here, $V_b$ is the voltage of a direct current power source given to the motor drive circuit 243, and $V_m$ is the voltage of a neutral point $N_n$ of the brushless motor 1. Additionally, since the brushless motor 1 is an inductive load, in this case, even the upper stage switching element $SWX_u$ is brought into an OFF state and the lower stage switching element $SWX_d$ is brought into an ON state, the current $I_x$ shown in the above Equation (41) continues flowing. Accordingly, the voltage $V_{xd}$ of the output end $N_x$ when the lower stage switching element $SWX_d$ is in an ON state becomes $$V_{xd} = -I_x \cdot R_g \quad (43)$$
$$= -(V_b - V_m) R_g / (R_b + R_m).$$

Hence, the output end voltage $V_{xa}$ equivalent to the x-phase voltage applied to the brushless motor 1 can be expressed like the following equations from Equations (42) and (43), using the duty ratio $D_x$ which is the ratio of the "ON" period of the upper stage switching element $SWX_u$.

$$V_{xa} = D_x \cdot V_{xu} + (1 - D_x) \cdot V_{xd} \quad (44)$$
$$= (V_b - V_m)\{D_x \cdot (R_m + R_g) - R_g\}/(R_b + R_m) + D_x \cdot V_m$$

Meanwhile, an ideal x-phase voltage $V_{xo}$ corresponding to the duty ratio $D_x$, i.e., the voltage of the output end Nx when $R_b = R_g = 0$, is $$V_{xo} = D_x \cdot V_b \quad (45).$$

Additionally, the voltage deviation at the output end $N_x$ is $V_{xa} - V_{xo}$. Thus, in this embodiment, the amount of correction $\Delta V_x$ is set to $$\Delta V_x = V_{xo} - V_{xa} \quad (46).$$

Accordingly, when the design values or actual measurements of the resistance $R_b$, $R_g$, and $R_m$ are given ($V_b$ and $V_m$ are known), in a case where an x-phase current flows into the brushless motor 1 from the motor drive circuit 243, the amount of correction $\Delta V_x$ to the various duty ratios $D_x$ can be calculated from Equations (44) to (46) in the case of $D_x > 0.5$.

Meanwhile, as shown in FIG. 15B, in a case where an x-phase current flows into the motor drive circuit 243 from the brushless motor 1, when the lower stage switching element $SWX_d$ is in an ON state, the x-phase current $I_x$ thereof is $$I_x = V_m/(R_g + R_m) \quad (47).$$

Thus, the voltage $V_{xd}$ of the output end $N_x$ at this time becomes $$V_{xd} = V_m \cdot R_g/(R_g + R_m) \quad (48).$$

Additionally, since the brushless motor 1 is an inductive load, in this case, even the lower stage switching element $SWX_d$ is brought into an OFF state and the upper stage switching element $SWX_u$ is brought into an ON state, the current $I_x$ shown in the above Equation (47) continues flowing. Accordingly, the voltage Vxu of the output end $N_x$ when the upper stage switching element $SWX_u$ is in an ON state becomes $$V_{xu} = V_b - I_x \cdot R_b \quad (49)$$
$$= V_b - V_m \cdot R_b / (R_g + R_m).$$

Hence, the output end voltage $V_{xa}$ equivalent to the x-phase voltage applied to the brushless motor 1 can be expressed like the following equations from Equations (48) and from (49), using the duty ratio ID), which is the ratio of the "ON" period of the upper stage switching element $SWX_u$ at N.

$$V_{xa} = D_x \cdot V_{xu} + (1 - D_x) \cdot V_{xd} \quad (50)$$
$$= V_m \cdot \{R_g - D_x \cdot (R_b + R_g)\}/(R_g + R_m) + D_x \cdot V_b$$

Meanwhile, an ideal x-phase voltage Vxo corresponding to the duty ratio $D_x$, i.e., the voltage of the output end $N_x$ when $R_b = R_g = 0$, is $$V_{xo} = D_x \cdot V_b \quad (51).$$

Accordingly, when the design values or actual measurements of the resistance $R_b$, $R_g$, and $R_m$ are given, in a case where an x-phase current flows into the motor drive circuit 243 from the brushless motor 1, the amount of correction $\Delta V_x$ to the various duty ratios $D_x$ can be calculated from Equations (50), (51), and (46) in the case of $D_x < 0.5$.

Since the amount of correction $\Delta V_x$ to various duty ratios $D_x$ can be obtained from Equations (44) to (46) and Equations (50) to (51) as described above, as to the phase, the x-phase correction map $37_x$ which correlates the amount of correction $\Delta V_x$ with the duty ratio $D_x$ as to the x-phase can be created (x=u, v, and w).

Figure 16:
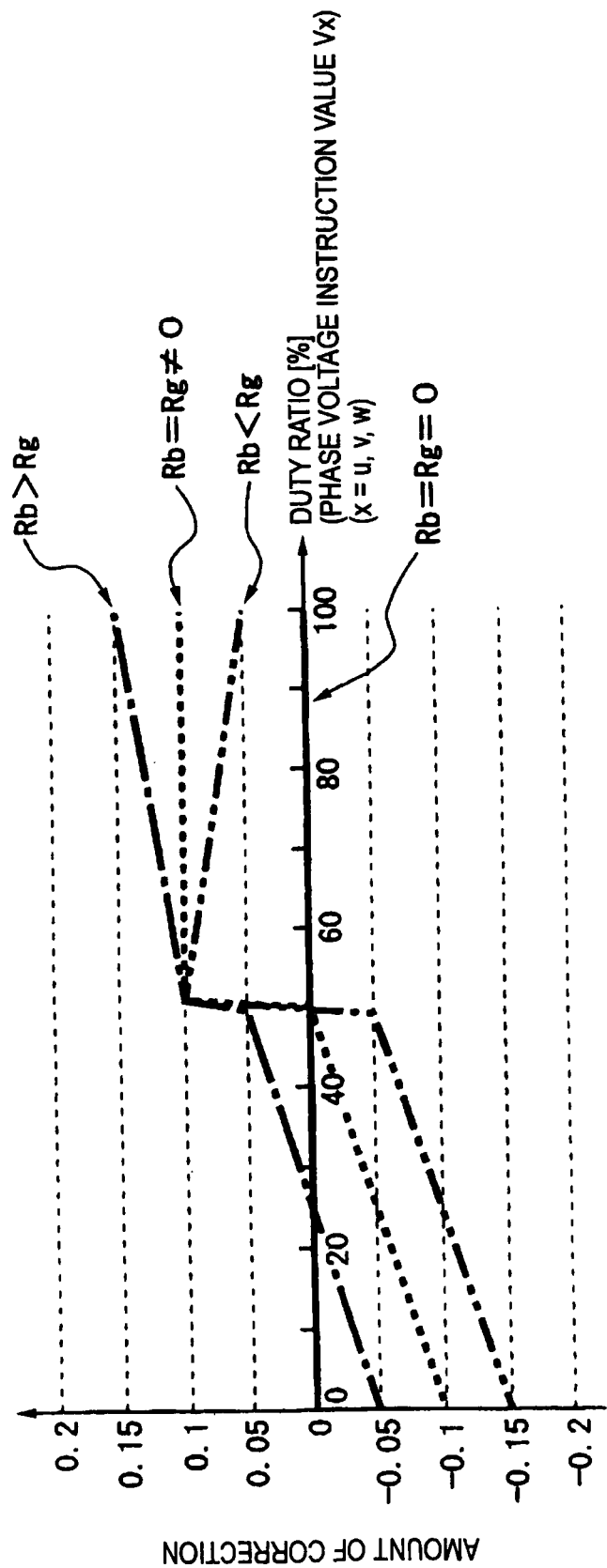
FIG. 16 is a view for explaining a correction map made based on the equivalent circuit shown in FIG. 15.

FIG. 16 is a view showing an example of a correction map made based on the equivalent circuits of FIGS. 15A and 15B according to the above simple model. Here, FIG. 16 simultaneously shows the correspondence relationship between the duty ratio $D_x$ and the amount of correction $\Delta V_x$ for convenience regarding four cases including the case of $R_b > R_g$, the case of $R_b = R_g \ne 0$, the case of $R_b < R_g$, and the case (ideal case) of $R_b = R_g = 0$. As described above, if the design values or actual measurements of the resistance $R_b$, $R_g$, and $R_m$ regarding the motor drive circuit 243 of the motor control device which is going to carry out the invention, and the brushless motor 1 are used (the supply voltage $V_b$, and the neutral point voltage $V_m$ are known), the correction 2 map $37x$ according to the resistance values of the resistances $R_b$, $R_g$, and $R_m$ can be made as a correction map which correlates the amount of correction $V_x$ with the duty ratio $D_x$ as to each phase. That is, the correction map $237_x$ (x=u, v, and w) in which the upper and lower stage resistance difference and the interphase resistance difference are reflected can be made. The correction map $237_x$ made in this way is a map which correlates various duty ratios $D_x$ with the amount of correction of the phase voltage instruction value $V_x$ by a curve (broken line) corresponding to any one of three cases excluding the ideal case (the case of $R_g=R_b=0$) among the four cases shown in FIG. 16. Here, the duty ratio $D_x$ can be expressed as $D_x=V_x/V_b$, using the x-phase voltage instruction value (before correction) $V_x$. Accordingly, the x-phase correction map $237_x$ can be used as a map which correlates the amount of correction $\Delta V_x$ with the x-phase voltage instruction value $V_x$ (x=u, v, and w).

12. Effects

According to the embodiment, as described above, the phase voltage instruction value $V_x$ (x=u, v, and w) calculated by the control calculation means is corrected for every phase by the correction calculating unit 236 with reference to the correction map $237_x$ made based on design values or actual measurements, such as the upper stage arm resistance $R_b$ and the lower stage arm resistance $R_g$ (refer to FIG. 13), and each switching element (FET) of the motor drive circuit 243 serving as a PWM voltage type inverter is driven (ON and OFF) according to the phase voltage instruction values $Vu_c$, $V_{vc}$, and $V_{wc}$ after correction. Thereby, even in a case where there is a difference (upper and lower stage resistance difference) between the upper stage arm resistance $R_b$ and the lower stage arm resistance $R_g$ in the motor drive circuit 243, voltages according to the phase voltage instruction values $V_u$, $V_v$, and $V_w$ are applied to the brushless motor 1 with high precision. Additionally, since the phase voltage instruction values $V_u$, $V_v$, and $V_w$ are corrected for every phase according to the respective phase voltage instruction values $V_x$ with reference to the correction maps $237_u$, $237_v$, and $237_w$ made for every phase, even in a case where an interphase resistance difference exists in the motor/driving circuit system, an interphase imbalance between the phase voltages $V_{ua}$, $V_{va}$, and $V_{wa}$ applied to the brushless motor 1 is suppressed.

Accordingly, according to such this embodiment, the torque ripple in the brushless motor 1 can be reduced. Meanwhile, when an attempt to suppress generation of a torque ripple is made by forming a wiring pattern so that the upper and lower stage resistance difference or interphase resistance difference in the motor drive circuit 243 serving as an inverter is eliminated, an increase in the size of the motor driving circuit board is caused. On the other hand, according to this embodiment, since the torque ripple is reduced by correction of the phase voltage instruction values $V_u$, $V_v$, and $V_w$, an increase in the size of the motor driving circuit board can be avoided, and an increase in wiring resistance can also be avoided. For this reason, in the electric power steering device using the motor control device according to this embodiment, an increase in the size of the motor driving circuit board is suppressed, so that the torque ripple can be suppressed to improve a steering feel while meeting the demand for miniaturization, low cost, high efficiency, etc.

13. Modification

In the above embodiment, there is provided a configuration (FIG. 13) in which the feedback control is performed so that the q-axis and d-axis component of an electric current which flow into the brushless motor 1 become equal to the q-axis and d-axis current instruction values $i_q^*$ and $i_d^*$, respectively. However, the invention can be applied to a case where the brushless motor 1 is driven by the open loop control based on the circuit equation of the motor.

In addition, the invention can be applied not only to the above-descried column assist type electric power steering device but also a pinion assist type or rack assist type electric power steering device. Additionally, the invention can also be applied to motor control devices other than the electric power steering device.

The invention claimed is:

1. A motor control device for driving a brushless motor, the motor control device comprising:
    a control calculation unit which obtains a phase voltage instruction value showing a phase voltage to be applied to the brushless motor;
    a current detecting unit which detects an electric current which flows into the brushless motor;
    a rotational position detecting unit which detects the rotational position of a rotor in the brushless motor;
    a correction unit which corrects the phase voltage instruction value based on the detection result of the current detecting unit and the detection result of the rotational position detecting unit so that a dependency of a ratio on an electric angle shown by a secondary harmonic component of the ratio concerning the electric angle of the brushless motor, the ratio being a ratio of a q-axis or d-axis component of the electric current, which flows into the brushless motor, to a q-axis or d-axis instruction value; and
    a driving unit which drives the brushless motor based on the phase voltage instruction value after the correction by the correction unit.

2. The motor control device according to claim 1,
    wherein the control calculation unit calculates q-axis and d-axis components of a voltage to be applied to the brushless motor as q-axis and d-axis voltage instruction values, respectively, and converts the q-axis and d-axis voltage instruction values into phase components of the voltage to be applied to the brushless motor, thereby obtaining the phase voltage instruction value, and
    wherein the correction unit includes:
        a data acquisition unit which calculates at least one of the ratio of the q-axis component of the electric current which flows into the brushless motor to a q-axis voltage instruction value, and the ratio of the d-axis component of the electric current which flows into the brushless motor to a d-axis voltage instruction value, based on the detection result of the current detecting unit, and correlates the calculated ratio with the electric angle of the brushless motor based on the detection result of the rotational position detecting unit so as to be stored as angle-dependent data;
        a correction coefficient determination unit which determines a correction coefficient for correcting the phase voltage instruction value, based on the angle-dependent data, so that the dependency on the electric angle shown by the secondary harmonic component is reduced; and
        a correction execution unit which corrects the phase voltage instruction value based on the correction coefficient determined by the correction coefficient determination unit.

3. The motor control device according to claim 1,
    wherein the control calculation unit determines q-axis and d-axis components of an electric current to flow to the brushless motor as q-axis and d-axis current instruction values, respectively, calculates the q-axis and d-axis components of the voltage to be applied to the brushless motors as q-axis and d-axis voltage instruction values, respectively, based on the q-axis and d-axis current instruction values, and converts the q-axis and d-axis voltage instruction values into phase components, respectively, of the voltage to be applied to the brushless motor, thereby obtaining the phase voltage instruction value, and wherein the correction unit includes:

a data acquisition unit which calculates at least one of the ratio of the q-axis component of the electric current which flows into the brushless motor to the q-axis current instruction value, and the ratio of the d-axis component of the electric current which flows into the brushless motor to the d-axis current instruction value, based on the detection result of the current detecting unit, and correlates the calculated ratio with the electric angle of the brushless motor based on the detection result of the rotational position detecting unit so as to be stored as angle-dependent data;

a correction coefficient determination unit which determines a correction coefficient for correcting the phase voltage instruction value, based on the angle-dependent data, so that the dependency on the electric angle shown by the secondary harmonic component is reduced; and a correction execution unit which corrects the phase voltage instruction value based on the correction coefficient determined by the correction coefficient determination unit.

4. The motor control device according to claim 1, wherein the correction unit corrects the phase voltage instruction value so that the dependency on the electric angle shown by the secondary harmonic component is reduced, based on the detection values of the electric current and rotational position obtained by the current detecting unit and the rotational position detecting unit when the detection value of the electric current obtained by the current detecting unit is smaller than a predetermined threshold value.

5. The motor control device according to claim 1, wherein the correction unit corrects the phase voltage instruction value so that the dependency on the electric angle shown by the secondary harmonic component is reduced, based on the detection values of the electric current and rotational position obtained by the current detecting unit and the rotational position detecting unit when the angular velocity of the rotor of the brushless motor is equal to or lower than a predetermined threshold value.

6. An electric power steering device which gives steering assist power to a steering mechanism of a vehicle by a brushless motor, the electric power steering device comprising:

the motor control device according to claim 1, wherein the motor control device drives the brushless motor which gives steering assist power to the steering mechanism.

* * * * *